US011953877B2

(12) United States Patent
Jurkovic et al.

(10) Patent No.: US 11,953,877 B2
(45) Date of Patent: Apr. 9, 2024

(54) AUTOMATED MANUFACTURING OF SHOE PARTS WITH A PICKUP TOOL

(71) Applicant: NIKE, Inc., Beaverton, OR (US)

(72) Inventors: Dragan Jurkovic, Taichung (TW);
Patrick Conall Regan, Singapore (SG);
Chih-Chi Chang, Douliou (TW);
Chang-chu Liao, Douliou (TW);
Ming-Feng Jean, Douliou (TW);
Kuo-Hung Lee, Douliu (TW); Yen-Hsi Liu, Chiayi County (TW); Hung-Yu Wu, Chiayi County (TW)

(73) Assignee: NILE, Inc., Beaverton, OR (US)

( * ) Notice: Subject to any disclaimer, the term of this patent is extended or adjusted under 35 U.S.C. 154(b) by 0 days.

(21) Appl. No.: 17/969,919

(22) Filed: Oct. 20, 2022

(65) Prior Publication Data
US 2023/0041146 A1     Feb. 9, 2023

Related U.S. Application Data

(60) Continuation of application No. 17/063,131, filed on Oct. 5, 2020, now Pat. No. 11,507,046, which is a
(Continued)

(51) Int. Cl.
*G05B 19/402* (2006.01)
*A43D 11/00* (2006.01)
(Continued)

(52) U.S. Cl.
CPC ............ *G05B 19/402* (2013.01); *A43D 11/00* (2013.01); *A43D 63/00* (2013.01);
(Continued)

(58) Field of Classification Search
CPC ............ G05B 19/402; G05B 19/41805; G05B 2219/45243; G05B 2219/45064;
(Continued)

(56) References Cited

U.S. PATENT DOCUMENTS 4,654,949 A    4/1987  Pryor
5,764,366 A    6/1998  Nguyen et al.
(Continued)

FOREIGN PATENT DOCUMENTS

WO    2017/123816 A1    7/2017
WO    2017/123817 A1    7/2017
WO    2017/123818 A1    7/2017

OTHER PUBLICATIONS

R. Kolluru, K. P. Valavanis, A. Steward and M. J. Sonnier, "A flat surface robotic gripper for handling limp material," in IEEE Robotics & Automation Magazine, vol. 2, No. 3, pp. 19-26, Sep. 1995, doi: 10.1109/100.414922 (Year: 1995).*
(Continued)

*Primary Examiner* — Christopher E. Everett
(74) *Attorney, Agent, or Firm* — Shook, Hardy & Bacon L.L.P.

(57) ABSTRACT

Manufacturing of a shoe or a portion of a shoe is enhanced by executing various shoe-manufacturing processes in an automated fashion. For example, information describing a shoe part may be determined, such as an identification, an orientation, a color, a surface topography, an alignment, a size, etc. Based on the information describing the shoe part, automated shoe-manufacturing apparatuses may be instructed to apply various shoe-manufacturing processes to the shoe part, such as a pickup and placement of the shoe part with a pickup tool.

11 Claims, 17 Drawing Sheets

Related U.S. Application Data division of application No. 15/867,490, filed on Jan. 10, 2018, now Pat. No. 10,795,335, which is a continuation-in-part of application No. 15/268,925, filed on Sep. 19, 2016, now Pat. No. 9,986,788, and a continuation-in-part of application No. 15/220,063, filed on Jul. 26, 2016, now Pat. No. 9,937,627, and a continuation-in-part of application No. 15/209,323, filed on Jul. 13, 2016, now Pat. No. 11,317,681, said application No. 15/220,063 is a continuation of application No. 14/978,253, filed on Dec. 22, 2015, now Pat. No. 9,403,280, said application No. 15/867,490 is a continuation-in-part of application No. 14/816,967, filed on Aug. 3, 2015, now Pat. No. 9,937,585, and a continuation-in-part of application No. 14/803,347, filed on Jul. 20, 2015, now Pat. No. 10,194,716, said application No. 14/978,253 is a continuation of application No. 14/661,565, filed on Mar. 18, 2015, now Pat. No. 9,238,305, said application No. 15/867,490 is a continuation-in-part of application No. 14/586,575, filed on Dec. 30, 2014, now Pat. No. 9,939,803, said application No. 14/816,967 is a continuation of application No. 14/481,501, filed on Sep. 9, 2014, now Pat. No. 9,096,016, said application No. 15/867,490 is a continuation-in-part of application No. 14/468,521, filed on Aug. 26, 2014, now Pat. No. 10,393,512, said application No. 14/803,347 is a continuation of application No. 14/267,503, filed on May 1, 2014, now Pat. No. 9,084,451, said application No. 15/268,925 is a continuation of application No. 14/162,271, filed on Jan. 23, 2014, now Pat. No. 9,447,532, said application No. 14/661,565 is a continuation of application No. 13/421,525, filed on Mar. 15, 2012, now Pat. No. 9,010,827, said application No. 14/267,503 is a continuation of application No. 13/299,872, filed on Nov. 18, 2011, now Pat. No. 8,755,925, said application No. 14/586,575 is a continuation of application No. 13/299,819, filed on Nov. 18, 2011, now Pat. No. 8,958,901, said application No. 14/468,521 is a continuation of application No. 13/299,827, filed on Nov. 18, 2011, now Pat. No. 8,849,620, said application No. 13/421,525 is a continuation of application No. 13/299,934, filed on Nov. 18, 2011, now abandoned, said application No. 14/481,501 is a continuation of application No. 13/299,908, filed on Nov. 18, 2011, now Pat. No. 8,858,744, said application No. 15/209,323 is a continuation of application No. 13/299,856, filed on Nov. 18, 2011, now Pat. No. 9,451,810.

(60) Provisional application No. 62/445,134, filed on Jan. 11, 2017.

(51) Int. Cl.
   *A43D 63/00* (2006.01)
   *G05B 19/418* (2006.01)

(52) U.S. Cl.
   CPC .... *G05B 19/41805* (2013.01); *A43D 2200/10* (2013.01); *A43D 2200/30* (2013.01); *A43D 2200/60* (2013.01); *G05B 2219/31028* (2013.01); *G05B 2219/37077* (2013.01); *G05B 2219/37555* (2013.01); *G05B 2219/45064* (2013.01); *G05B 2219/45243* (2013.01)

(58) Field of Classification Search
   CPC .......... G05B 2219/37555; G05B 2219/31028; G05B 2219/37077; A43D 11/00; A43D 63/00; A43D 2200/60; A43D 2200/30; A43D 2200/10
   See application file for complete search history.

(56) References Cited

U.S. PATENT DOCUMENTS

| | | | |
|---|---|---|---|
| 6,015,174 A | 1/2000 | Raes et al. | |
| 6,413,022 B1 | 7/2002 | Sarh | |
| 6,823,763 B1 | 11/2004 | Foster et al. | |
| 7,017,961 B1 | 3/2006 | Parnell et al. | |
| 8,135,208 B1* | 3/2012 | Vangal-Ramamurthy | G06T 7/80 700/254 |
| 8,755,925 B2 | 6/2014 | Regan et al. | |
| 8,849,620 B2 | 9/2014 | Regan et al. | |
| 8,858,744 B2 | 10/2014 | Regan et al. | |
| 8,958,901 B2 | 2/2015 | Regan | |
| 9,010,827 B2 | 4/2015 | Regan et al. | |
| 9,084,451 B2 | 7/2015 | Regan et al. | |
| 9,096,016 B2 | 8/2015 | Regan et al. | |
| 9,238,305 B2 | 1/2016 | Regan et al. | |
| 9,403,280 B2 | 8/2016 | Regan et al. | |
| 9,447,532 B2 | 9/2016 | Jurkovic et al. | |
| 9,451,810 B2 | 9/2016 | Regan et al. | |
| 9,937,585 B2 | 4/2018 | Regan et al. | |
| 9,937,627 B2 | 4/2018 | Regan et al. | |
| 9,939,803 B2 | 4/2018 | Regan | |
| 2001/0045755 A1 | 11/2001 | Schick et al. | |
| 2005/0226711 A1* | 10/2005 | Schnoor | B65G 61/00 414/736 |
| 2006/0242785 A1 | 11/2006 | Cawley et al. | |
| 2009/0297316 A1 | 12/2009 | Wells et al. | |
| 2010/0040450 A1 | 2/2010 | Parnell | |
| 2012/0323358 A1* | 12/2012 | Izumi | G06V 10/26 901/50 |
| 2013/0125319 A1 | 5/2013 | Regan | |
| 2013/0127192 A1 | 5/2013 | Regan et al. | |
| 2013/0127193 A1 | 5/2013 | Regan et al. | |
| 2014/0362079 A1 | 12/2014 | Regan et al. | |
| 2015/0298320 A1 | 10/2015 | Eisele et al. | |
| 2015/0374073 A1 | 12/2015 | Regan et al. | |
| 2016/0316859 A1 | 11/2016 | Regan et al. | |
| 2017/0000218 A1 | 1/2017 | Jurkovic et al. | |
| 2018/0129185 A1 | 5/2018 | Jurkovic et al. | |
| 2021/0018893 A1 | 1/2021 | Jurkovic et al. | |

OTHER PUBLICATIONS

Engelberger, Josephf. , "End Effectors: Hands, Grippers, Pickups and Tools", Robotics in Practice, Management and Applications of Industrial Robots, Springer, Boston, MA, 1980, 305 pages.

* cited by examiner

AUTOMATED MANUFACTURING OF SHOE PARTS WITH A PICKUP TOOL

CROSS-REFERENCE TO RELATED APPLICATIONS

This application is a continuation application of U.S. patent application Ser. No. 17/063,131, filed Oct. 5, 2020 and entitled "AUTOMATED MANUFACTURING OF SHOE PARTS WITH A PICKUP TOOL," which is a divisional application of U.S. patent application Ser. No. 15/867,490, filed Jan. 10, 2018 and entitled "AUTOMATED MANUFACTURING OF SHOE PARTS WITH A PICKUP TOOL," which is a:

1) continuation-in-part of U.S. patent application Ser. No. 14/586,575, filed Dec. 30, 2014, and entitled "AUTOMATED MANUFACTURING OF SHOE PARTS," which is a continuation of U.S. patent application Ser. No. 13/299,819, filed Nov. 18, 2011, and entitled "AUTOMATED MANUFACTURING OF SHOE PARTS;"
2) continuation-in-part of U.S. patent application Ser. No. 15/209,323, filed Jul. 13, 2016, and entitled "AUTOMATED IDENTIFICATION OF SHOE PARTS," which is a continuation of U.S. patent application Ser. No. 13/299,856, filed Nov. 18, 2011, and entitled "AUTOMATED IDENTIFICATION OF SHOE PARTS;"
3) continuation-in-part of U.S. patent application Ser. No. 14/468,521, filed Aug. 26, 2014, and entitled "AUTOMATED 3-D MODELING OF SHOE PARTS," which is a continuation of U.S. patent application Ser. No. 13/299,827, filed Nov. 18, 2011, and entitled "AUTOMATED 3-D MODELING OF SHOE PARTS;"
4) continuation-in-part of U.S. patent application Ser. No. 14/803,347, filed Jul. 20, 2015, and entitled "AUTOMATED IDENTIFICATION AND ASSEMBLY OF SHOE PARTS," which is a continuation of U.S. patent application Ser. No. 14/267,503, filed May 1, 2014, and entitled "AUTOMATED IDENTIFICATION AND ASSEMBLY OF SHOE PARTS," which is a continuation of U.S. patent application Ser. No. 13/299,872, filed Nov. 18, 2011, and entitled "AUTOMATED IDENTIFICATION AND ASSEMBLY OF SHOE PARTS;"
5) continuation-in-part of U.S. patent application Ser. No. 14/816,967, filed Aug. 3, 2015, and entitled "MULTI-FUNCTIONAL MANUFACTURING TOOL," which is a continuation of U.S. patent application Ser. No. 14/481,501, filed Sep. 9, 2014, and entitled "MULTI-FUNCTIONAL MANUFACTURING TOOL," which is a continuation of U.S. patent application Ser. No. 13/299,908, filed Nov. 18, 2011, and entitled "MULTI-FUNCTIONAL MANUFACTURING TOOL;"
6) continuation-in-part of U.S. patent application Ser. No. 15/220,063, filed Jul. 26, 2016, and entitled "MANUFACTURING VACUUM TOOL," which is a continuation of U.S. patent application Ser. No. 14/978,253, filed Dec. 22, 2015, and entitled "MANUFACTURING VACUUM TOOL," which is a continuation of U.S. patent application Ser. No. 14/661,565, filed Mar. 18, 2015, and entitled "MANUFACTURING VACUUM TOOL," which is a continuation of U.S. patent application Ser. No. 13/421,525, filed Mar. 15, 2012, and entitled "MANUFACTURING VACUUM TOOL," which is a continuation-in-part of U.S. patent application Ser. No. 13/299,934, filed Nov. 18, 2011, and entitled "MANUFACTURING VACUUM TOOL;"
7) continuation-in-part of U.S. patent application Ser. No. 15/268,925, filed Sep. 19, 2016, and entitled "AUTOMATED ASSEMBLY AND STITCHING OF SHOE PARTS," which is a continuation of U.S. patent application Ser. No. 14/162,271, filed Jan. 23, 2014, and entitled "AUTOMATED ASSEMBLY AND STITCHING OF SHOE PARTS;" and
8) U.S. patent application Ser. No. 15/867,490 claims the benefit of U.S. Provisional Application No. 62/445,134, entitled "Automated Manufacturing of Shoe Parts," and filed Jan. 11, 2017.

The entireties of the aforementioned applications are incorporated by reference herein.

BACKGROUND

Manufacturing a shoe typically requires various assembly steps, such as forming, placing, and assembling several parts. Some methods of completing these steps, such as those that rely heavily on manual execution, may be resource intensive and may have a high rate of variability.

SUMMARY

This summary provides a high-level overview of the disclosure and of various aspects of the invention and introduces a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, manufacturing of a shoe or other article (e.g., garments—shirts, shorts, pants, socks, outerwear, under wear) in an automated fashion. For example, by analyzing an image of the shoe part, information describing the shoe part may be derived, such as an identification and orientation of a shoe part, shoe-part surface topography, shoe-part size, shoe-part alignment, etc. Based on the identification and the orientation, automated shoe-manufacturing apparatuses may be instructed to apply various shoe-manufacturing processes to the shoe part.

An exemplary system that manufactures shoes and/or shoe parts in an automated fashion may be comprised of various components, such as manufacturing stations, a part-recognition system, and shoe-manufacturing apparatuses and tools. In one exemplary aspect, the part-recognition system analyzes images of shoe parts to generate image-derived information (e.g., shoe-part identification, shoe-part orientation, surface topography, part alignment, part size, etc.). The image-derived information is used to instruct shoe-manufacturing tools that pickup, transfer, place, and attach shoe parts at desired positions.

An exemplary method for manufacturing a shoe part in an automated manner may comprise various steps. For example, a first shoe part may be positioned at a manufacturing station, such that a part-recognition system determines an identity of the first shoe part and determines an orientation of the first shoe part. In addition, a second shoe part may be retrieved from another manufacturing station, such that the part-recognition system determines an identity of the second shoe part and determines an orientation of the second shoe part. A part-manufacturing apparatus may be used to transfer the second shoe part from the second-shoepart orientation to a subsequent orientation, which is determined based on the orientation and identity of the first shoe part. In addition, the part-manufacturing apparatus, which transferred the second part, may be used to temporarily attach the second shoe part to the first shoe part to maintain positioning for downstream processing.

In a further exemplary method for manufacturing a shoe part in an automated manner, a first shoe part may be positioned on a support surface at a first manufacturing station, such that the first shoe part is substantially flat on the support surface. In addition, a first automated part pickup tool may place a second shoe part on top of the first shoe part. A first automated attachment tool may attach the second shoe part to the first shoe, thereby forming an assembly of the first shoe part and the second shoe part. Moreover, the assembly may be moved to a second manufacturing station, such that a second automated part pickup tool places a third shoe part on top of the assembly, and a second automated attachment tool may attach the third shoe part to the assembly.

In another exemplary method for manufacturing a shoe part in an automated manner, a first shoe part may be positioned at a first manufacturing station, such that a part-recognition system determines an identity of the first shoe part and determines an orientation of the first shoe part. In addition, a second shoe part and third shoe part may be retrieved from another manufacturing station, such that the part-recognition system determines respective identities and respective orientations of the second shoe part and the third shoe part. A part-manufacturing apparatus may be used to sequentially transfer the second shoe part and the third shoe part from the respective orientations to respective subsequent orientations to be attached to the first shoe part based on the orientation and location of the first shoe part. In addition, the part-manufacturing apparatus, which sequentially transferred the second shoe part and the third shoe part, may be used to attach the second shoe part and the third shoe part to the first shoe part.

An exemplary system that positions a shoe part in an automated manner may have various components, such as an image recorder that records an image depicting a representation of an attachment shoe part. The system may also have a part-transfer apparatus that transfers a first shoe part (e.g., attachment shoe part) to a location at which the first shoe part is to be attached to a second shoe part (e.g., a base shoe part). An exemplary system may further comprise multiple cameras positioned at various locations within the system. For example, cameras may be mounted above a shoe part and/or below the shoe part. Cameras may also be positioned at various angles with respect to a shoe part or horizontally to a shoe part. Further, cameras may be mounted directly to the part-transfer apparatus or mounted remotely from the part-transfer apparatus. The cameras may record images of a shoe part prior to the shoe part being acquired by a part-transfer apparatus. Moreover, the cameras may record images of a shoe part while the shoe part is acquired by the part-transfer, such as when the part-transfer apparatus positions the acquired shoe part in front of a camera.

An exemplary system may also comprise a lighting system that illuminates a shoe part, such as by providing a front light or a back light. The lighting system may be integrated directly into the part-transfer apparatus, into the space surrounding the part-transfer apparatus and shoe part, and/or into a supply station that stores a shoe part prior to being acquired by the part-transfer apparatus. The lighting system may be comprised of full spectrum light and/or may be comprised of colored lights that are tailored to create contrast with shoe parts having specific colors.

One or both of the first shoe part (e.g., attachment shoe part) and the second shoe part (e.g., base shoe part) may be identified and/or located in space using systems and/or methods in accordance with the present invention. Moreover, other components may instruct the part-transfer apparatus, such as a computing device that executes various operations. Exemplary operations may derive at least one reference feature from the representation of the first shoe part and determine pixel coordinates of the image that correspond to the at least one reference feature. Additional operations may convert the pixel coordinates of the image to a geometric coordinate in a geometric coordinate system, which maps a three-dimensional space within which the first shoe part is positioned and the part-transfer apparatus operates. Other operations may determine a geometric coordinate that defines a position of the base shoe part.

An exemplary method for positioning a shoe part in an automated manner during a shoe-manufacturing process may have various steps. For example, an image may be received that depicts a two-dimensional representation of an attachment shoe part, which is to be attached to a base shoe part. The two-dimensional representation of the attachment shoe part may be associated with at least one reference feature that is identified. In addition, pixel coordinates of the image may be determined that correspond to the at least one pre-determined reference feature and that may be converted to a geometric coordinate of a geometric coordinate system. Other geometric coordinates may also be determined, such as a part-position coordinate to which the attachment part will be moved. As such, the attachment shoe part may be moved from the geometric coordinate to the part-position coordinate. In a further exemplary method, a part-attachment coordinate may also be determined, such that the attachment shoe part may be attached at the part-attachment coordinate.

BRIEF DESCRIPTION OF THE SEVERAL VIEWS OF THE DRAWINGS

Illustrative aspects of the present invention are described in detail below with reference to the attached drawing figures, which are incorporated by reference herein, wherein.

DETAILED DESCRIPTION

The subject matter of certain aspects of the present invention is described with specificity herein to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

Figure 7:
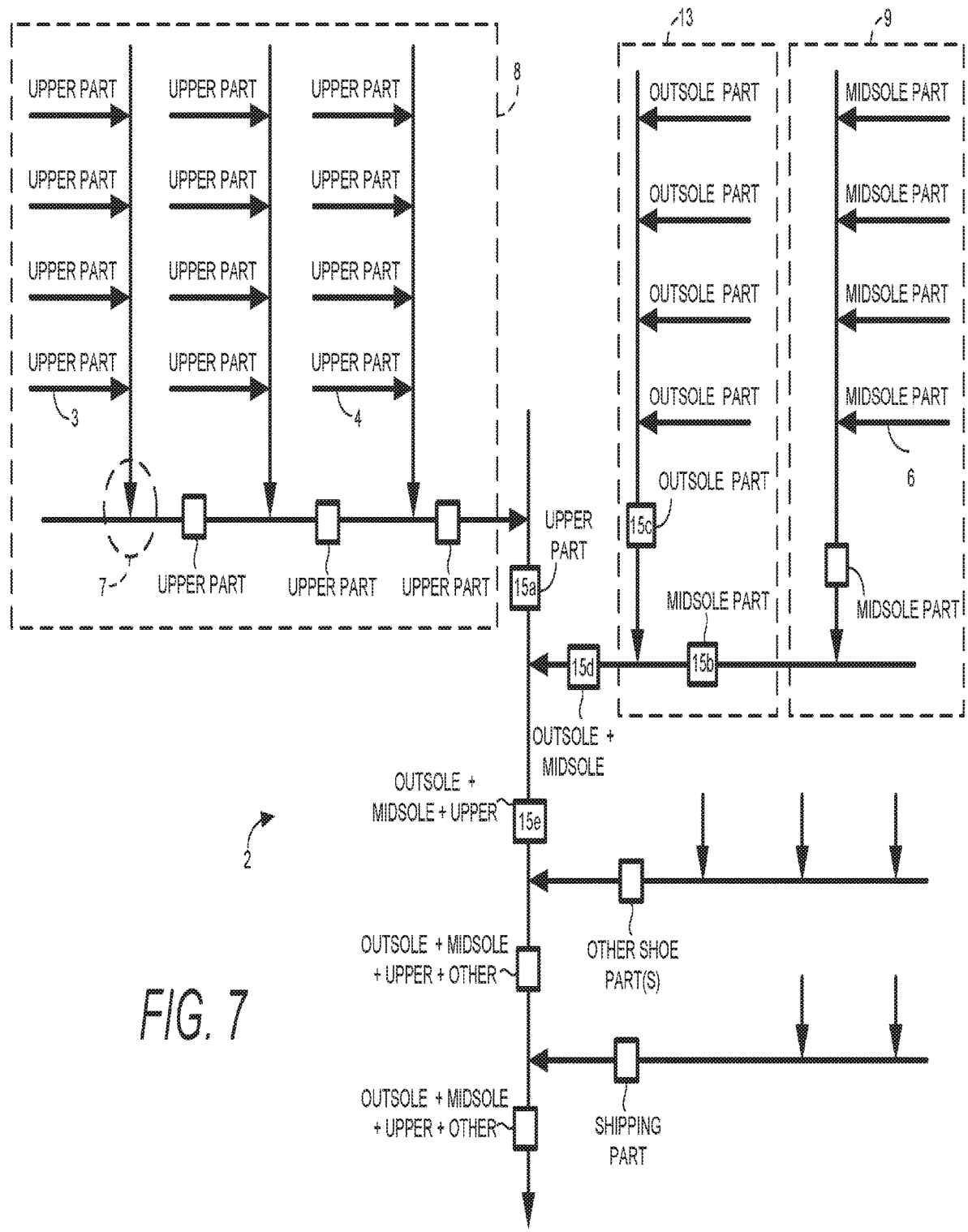
FIGS. 7 and 8 depict schematic diagrams of an overall process flow for manufacturing shoe parts in an automated manner in accordance with the present invention.

Subject matter described herein relates to automated manufacturing of shoe parts, and FIG. 7 depicts a schematic diagram of an overall process flow for an exemplary shoe-part manufacturing system 2. For example, FIG. 7 may illustrate a birds-eye perspective of various shoe-part-manufacturing apparatuses and processes that are depicted by various arrows.

Each arrow in FIG. 7 may represent a step, stage, and/or process, that is performed on one or more shoe parts or shoe-part assemblies and that may be performed in an automated manner, manually, or some combination thereof. Exemplary steps, stages, and/or processes may be comprised of cutting, stitching, attaching, stamping, molding, slicing, or otherwise making individual shoe parts. Other exemplary steps, stages, and/or processes may be comprised of moving or relocating a part, as well as placing a part with respect to another part (e.g., on top of another part). For example, system 2 may be comprised of part-moving apparatuses that sort a set of parts into subsets, which are moved along a designated path or stream within system 2. Additional steps, stages, and/or processes may be comprised of attaching one or more parts together, such as by stitching, adhering, sonic welding, melting, gluing, etc. These steps, stages, and/or processes that are listed are merely exemplary, and a variety of other shoe-manufacturing processes may be carried out by system 2 and the various stations (i.e., arrows) depicted therein. As such, system 2 depicts various processes that converge and combine to manufacture various shoe-part assemblies.

A variety of different shoe-manufacturing apparatuses may be utilized to carry out the various functions represented by the arrows depicted in FIG. 7. Shoe-manufacturing apparatuses may perform respective functions in an automated manner, may be used as an instrument to assist with manual execution, or may function in a manner that is both automated and manual. Exemplary shoe-manufacturing apparatuses may comprise a part-moving apparatus (e.g., conveyor system, motor-driven turntable, robotic arm, etc.); a part-pickup tool (e.g., vacuum tool, grasping tool, scooping tool, surface tack, adhesion etc.); a part-attachment tool (e.g., sewing apparatus, sonic-welding tool, heat press, cold press, etc.); an image-capturing device (e.g., camera, video recorder, charge-coupled device, etc.); a laser; a light-emitting device (e.g., LED, fluorescent light bulb, full spectrum light bulb, color-specific light bulb, etc.); and a computing device. This list of shoe-manufacturing apparatuses is merely exemplary and a variety of other apparatuses may also be comprised in system 2. As such, one or more of these exemplary shoe-manufacturing apparatuses may be represented by an arrow in FIG. 7. Further, while the term "shoe-manufacturing apparatuses" is used, it is appreciated that the listed devices, components, and techniques may be used to manufacture any article, such as apparel, outerwear, and the like.

System 2 is comprised of various modular stations and components that may be moved from one position to another to perform the same or different tasks. For example, a certain modular component (e.g., pickup tool or part-moving apparatus) that operates at arrow 3 to process an upper part of a shoe upper may be interchangeable with a component that operates at arrow 4 or at arrow 6. Moreover, the various modular stations that comprise system 2 may be replaced or modified based on a particular type of shoe part on which the station is operating. For example, a shoe-part-manufacturing apparatus that operates at intersection 7 may be configured to process a certain type or style of shoe upper part, and the system 2 may be instructed to process a certain number of that type or style (e.g., 1000 units). However, after the certain number of parts is processed, the shoe-part-manufacturing apparatus that operates at intersection 7 may be reconfigured or modified to operate on a different style or type. Moreover, specific stations (i.e., arrows) may be added, subtracted, powered up, or powered down based on a certain style or type of shoe that is being manufactured. For example, although arrow 3 may be utilized when processing one type of shoe part, arrow 3 may be powered down or removed when system 2 is processing a different type of shoe part.

System 2 may also be comprised of shoe-part-specific groupings of apparatuses. For example, grouping 8 is comprised of upper-part-manufacturing apparatuses, grouping 9 is comprised of midsole-part-manufacturing apparatuses, and grouping 13 is comprised of outsole-part-manufacturing apparatuses. While FIG. 7 may depict a particular arrangement of groupings 8, 9, and 13, a variety of alternative arraignments may be utilized. For example, although FIG. 7 depicts a midsole part 15b being fed to grouping 13, in another aspect an outsole part may be fed to a midsole-part grouping 9. Moreover, an assembly of a midsole and outsole may be fed into a grouping 8 directed to upper-part assembly.

In a further aspect, information may be gathered at various stations that is utilized to carry out various shoe-manufacturing processes. For example, information may be derived by analyzing one or more images that depict a representation of a shoe part and/or assembly of shoe parts. In addition, information may be derived by projecting a laser onto a shoe part, capturing an image of the projected laser line, and analyzing the image. Exemplary information that may be gathered may describe various aspects of a shoe part, such as a size, shape, surface topography, placement, orientation, rotation, alignment, etc.

Accordingly, in a further aspect, once information has been generated, collected, or derived, the information may be shared among components of each grouping. For example, information (e.g., shoe-part identity, shoe-part orientation, shoe-part size, etc.) may be communicated among the various shoe-manufacturing apparatuses (e.g., arrows) depicted in grouping 8. Moreover, information derived in one grouping may be shared with another grouping. For example, information about a midsole assembly (e.g., information describing a size of a midsole assembly)

may be derived from shoe-manufacturing apparatuses in grouping 9 and then shared with grouping 13 in order to instruct processes directed to outsole-part manufacturing. Furthermore, information derived from groupings 9 and 13 may be combined to instruct steps directed to combining a midsole and an outsole. In a further aspect, information derived from grouping 9 and/or 13 may be communicated to grouping 8 to instruct operations directed to upper-part construction. A variety of other types of information may be shared among the various components of system 2 to enable system 2 to carry out shoe-manufacturing processes in an automated manner.

The arrangement of arrows as depicted in system 2 is exemplary and the arrows (i.e., manufacturing stages) may be rearranged in various other configurations. For example, system 2 may be comprised of a circular track (e.g., conveyor system) that has manufacturing arms or spokes (e.g., other conveyor systems) feeding into a central circular track or feeding outward towards a circumscribing circular track. In another exemplary system, a main track may be arranged in a zigzag pattern that traverses from one station to the next. Again, these described arrangements are merely examples, and a variety of other arrangements may be utilized.

FIG. 7 depicts that system 2 may be comprised of an upper-part grouping 8 of components that are directed to manufacturing an upper-part of a shoe assembly. As such, each arrow in grouping 8 may feed a different upper part (e.g., base layer, mesh layer, adhesive layer, eyelet reinforcement, support layer, aesthetic layer, etc.) into the overall upper-part assembly and/or may carry out a respective function. Exemplary functions may comprise cutting a part, identifying a part, determining a location and orientation of a part, moving a part to a placement with respect to another part, stacking a part, and attaching the part to another part. Accordingly, an overall upper-part assembly 15a may be constructed by grouping 8 and transferred downstream to one or more other groupings. As already described, information (e.g., sizing, shape, position, style, color, etc.) that describes the overall upper-part assembly 15a may be derived from grouping 8 (such as by using a 2-D or 3-D image-analysis system) and may be passed downstream in coordination with assembly 15a.

FIG. 7 further depicts that grouping 9 is comprised of multiple midsole-part components that coordinate to create a midsole part 15b. Exemplary midsole-part components (e.g., arrows in grouping 9) may provide respective midsole parts and perform respective functions. Exemplary functions may comprise cutting a part, molding a part, painting a part, identifying a part, determining a location and orientation of a part, stacking a part, moving a part to a placement with respect to another part, and attaching the part to another part. Various midsole parts may be integrated and assembled in grouping 9, such as cushioning elements, support elements, and/or torsion-control elements. Examples of midsole components may comprise foam, rubber, and/or other polymers having various qualities, air pockets, phylon elements, and/or other molded components. Information describing midsole part 15b may be derived from grouping 9 (such as by using a 2-D or 3-D image-analysis system) and may be passed downstream in coordination with assembly 15b.

FIG. 7 also depicts that grouping 13 is comprised of multiple outsole-part components that coordinate to create an outsole part 15c. Exemplary outsole-part components (i.e., arrows included in grouping 13) may provide respective outsole parts and perform respective functions. Exemplary functions may comprise cutting a part, molding a part, painting a part, identifying a part, determining a location and orientation of a part, stacking a part, moving a part to a placement with respect to another part, and attaching the part to another part. Various outsole parts may be integrated and assembled in grouping 13, such as traction/tread elements, support elements, cushioning elements, and protective elements. Examples of outsole components may comprise foams, rubbers, Ethyl-vinyl acetate, and other polymer-based materials having various qualities. Information describing outsole part 15c may be derived from grouping 13 (such as by using a 2-D or 3-D image-analysis system) and may be passed downstream in coordination with assembly 15c.

FIG. 7 further depicts that a midsole part may be combined with an outsole part to make an outsole-and-midsole assembly 15d. Moreover, information derived from grouping 13 may be combined with information derived from grouping 9 and communicated downstream in coordination with the outsole-and-midsole assembly 15d. In a further aspect, an outsole-and-midsole assembly may be combined with an upper part (e.g., lasted or unlasted) to create an assembly 15e having an outsole, a midsole, and an upper. Again, information derived from each respective grouping may be passed along in coordination and compiled at each station.

Once an upper, a midsole, and an outsole have been assembled, various other shoe-manufacturing processes may be carried out by system 2. For example, quality checks may be performed by system 2. Moreover, other parts may be added to the assembly, such as laces or certain aesthetic elements. In addition, processes (e.g., packaging, cleaning, etc.) may be carried out by system 2 that prepare a shoe to be transported or shipped to another location.

Figure 8:
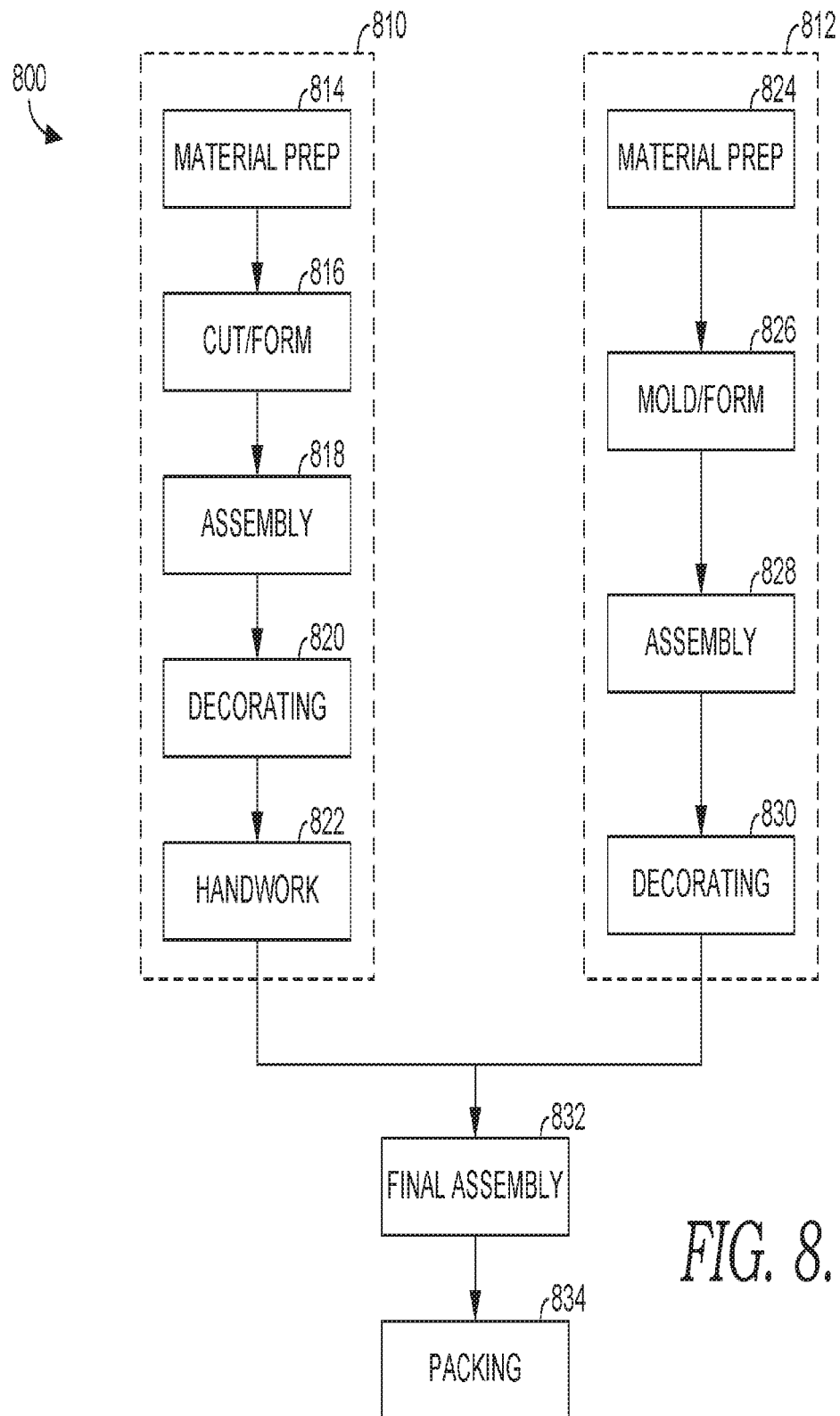

FIG. 8 depicts a schematic diagram of another exemplary overall process flow for a shoe-part manufacturing system 800. The system 800 may comprise an upper manufacturing system 810 (hereinafter referred to as the upper system 810) as well as a bottom manufacturing system 812 (hereinafter referred to as the bottom system 812). The upper system 810 may comprise a material prep station 814, a cut/form station 816, an assembly station 818, a decorating station 820, and/or a handwork station 822. Manufacturing steps performed at these stations may include manual manufacturing steps, automated manufacturing steps, and/or a combination of both manual and automated manufacturing steps. Further, although the upper system 810 is depicted as comprising five stations, the upper system 810 may comprise additional stations. Alternatively, the upper system 810 may comprise less than five stations. Additionally, manufacturing steps performed at one station may be performed at a different manufacturing location or facility than the other stations. Further, one or more stations could be combined such that manufacturing steps associated with individual stations are combined at the combined station(s).

Exemplary functions performed at the material prep station 814 may include assembling and organizing materials that will be used in shoe-upper construction, pre-treating materials where appropriate, and stacking materials. Exemplary functions performed at the cut/form station 816 may include die-cutting shapes, molding shapes, casting shapes, and/or knitting shapes. Continuing, exemplary functions performed at the assembly station 818 may include assembling the different shapes received from the cut/form station 816 into a shoe upper. Assembly may comprise stitching, fusing, welding, attaching, gluing, heat pressing, and the like.

After the shoe upper is assembled at the assembly station 818, it may continue on to the decorating station 820.

Exemplary functions performed at the decorating station 820 may include high frequency (HF) embossing, spray painting, screen printing, and/or digital painting. Next, the shoe upper may proceed on to the handwork station 822. Exemplary functions performed at the handwork station 822 may include stitch closure, strobel attachment, and/or lasting. After processing at the handwork station 822, the shoe upper may proceed on to a final assembly station 832. This aspect will be explained in greater depth below. In one aspect, manufacturing steps performed at the upper system 810 take place in two-dimensional (2-D) space. Thus, shape recognition technologies may focus on recognizing shoe upper components in 2-D space.

Turning now to the bottom system 812, the bottom system may comprise a material prep station 824, a mold/form station 826, an assembly station 828, and/or a decorating station 830. Manufacturing steps performed at these stations may include manual manufacturing steps, automated manufacturing steps, and/or a combination of both manual and automated manufacturing steps. Further, although the bottom system 812 is depicted as comprising four stations, the bottom system 812 may comprise additional stations. Alternatively, the bottom system 812 may comprise less than four stations. Additionally, manufacturing steps performed at one station may be performed at a different manufacturing location or facility than the other stations. Further, one or more stations could be combined such that manufacturing steps associated with individual stations are combined at the combined station(s).

Exemplary functions performed at the material prep station 824 may include assembling and prepping materials to be used for midsole construction and outsole construction. This may include, for example, assembling and/or manufacturing rubberized pellets to be used for molding midsoles and/or outsoles, assembling sheets of material (e.g., rubber, foam, polyurethane), and/or stacking such materials. At the mold/form station 826, the midsole and outsole are molded or formed out of the assembled materials. For instance, the rubberized pellets may be deposited in a mold and heat applied to form the pellets into a midsole and/or outsole. As well, the midsole and/or outsole may be die-cut from materials such as foam and/or rubber. After die-cutting, the materials may be further processed by molding the material into a desired shape for the midsole and/or outsole by, for example, applying heat. Additional functions may include removing the midsole and/or outsole from molds.

Next, the midsole and/or outsole may proceed to the assembly station 828 where the midsole and outsole are joined together by utilizing attachment technologies such as, for example, adhesive. Various midsole parts may also be integrated into the midsole/outsole complex. These may include cushioning elements, support elements, and/or torsion-control elements. In one aspect, adhesive is applied to the outsole and the midsole is pressed into the outsole (e.g., a predetermined pressure is applied for a predetermined amount of time to the midsole/outsole assembly to facilitate adhesion). Heat may or may not be applied in this process to facilitate adhesion. Next, the midsole/outsole complex may proceed to the decorating station 830 where the midsole may be spray painted. The midsole/outsole complex may then proceed to the final assembly station 832. In one aspect, manufacturing steps performed at the bottom system 812 take place in three-dimensional (3-D) space. Thus, shape recognition technologies may focus on recognizing shoe midsole and outsole components in 3-D space.

Exemplary functions performed at the final assembly station 832 may include attaching the shoe upper to the midsole/outsole complex. Such attachment may occur, for example, by the application of an adhesive, pressure, and/or heat. Next, the completed shoe proceeds to a packing station 834 where the shoe is boxed and readied for shipping. In one aspect, the final assembly station 832 and the packing station 824 may be combined into a single station. As well, the final assembly station 832 and/or the packing station 834 may be located at another manufacturing location or facility than the other stations. The process flow depicted in FIGS. 7 and 8 may be extended to manufacturing any number of soft pieces in a flat arrangement using welding and/or stitching. For example, the upper system 810 described in FIG. 8 may be applied to manufacturing items such as purses, duffle bags, backpacks, and clothing articles.

Quality control, either manual or automated, may occur throughout the system 800. For example, with respect to the upper system 810, 2-D recognition technology may be employed to ensure that parts or shapes are properly placed and/or stacked during the assembly process. As well, with respect to the bottom system 812, 3-D recognition technology may be employed to ensure that the midsole and/or outsole are properly formed and/or aligned with each other when the midsole is attached to the outsole. A final quality control check may occur after final assembly but before packing.

Figure 1:
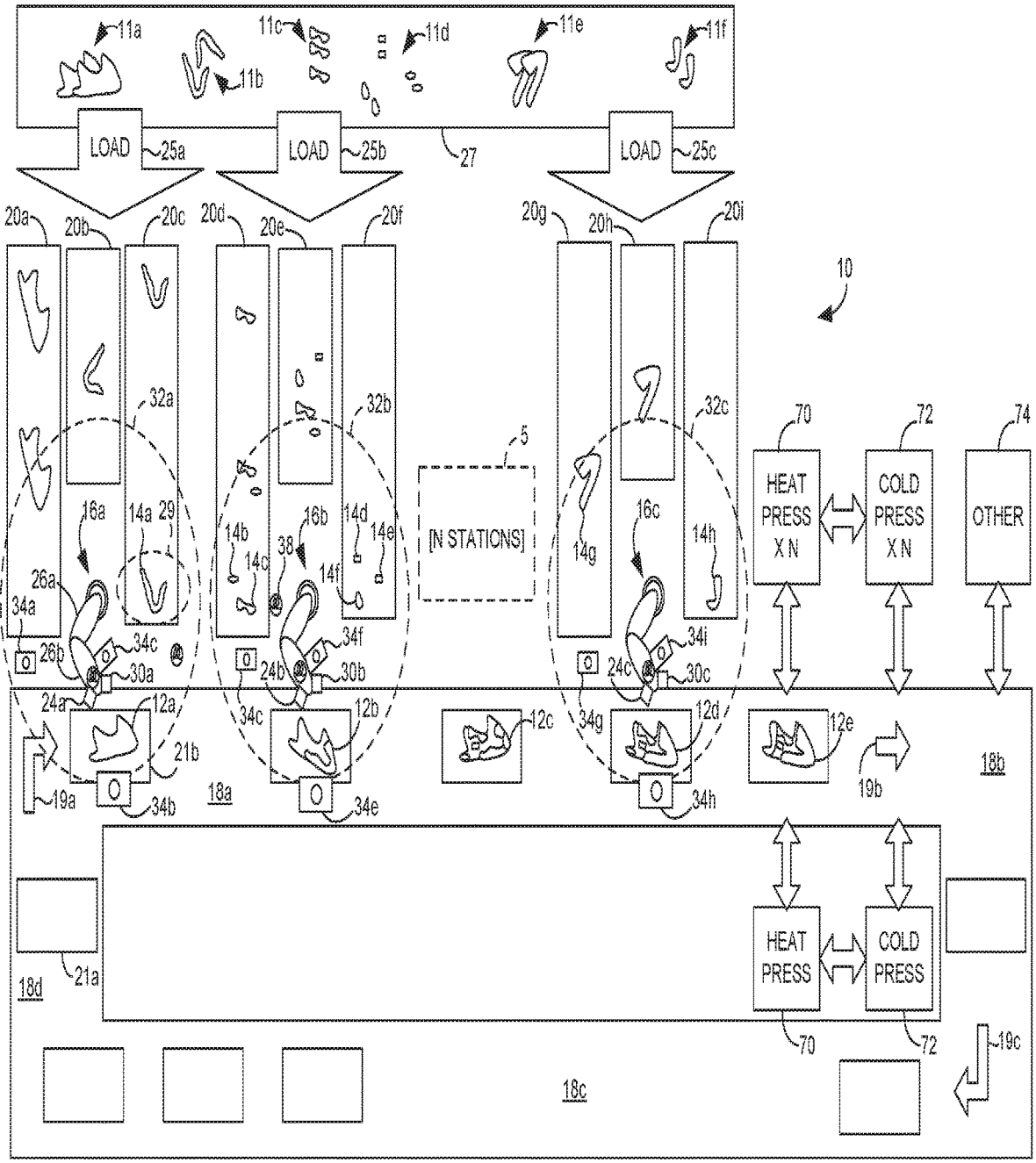
FIGS. 1, 2, and 3 depict schematic diagrams of exemplary systems for manufacturing shoe parts in an automated manner in accordance with the present invention.

Referring now to FIG. 1, a grouping of shoe-part-manufacturing apparatuses is illustrated as part of an exemplary shoe-part manufacturing system 10, which is depicted from a birds-eye perspective. System 10 is comprised of various automated manufacturing apparatuses and tools, which may function to, among other things, position and assemble shoe parts. Moreover, system 10 may be comprised of one or more stations, which are arranged in an order that may be at least partially automated. For example, FIG. 1 depicts three general stations, as well as a box 5 that represents a placeholder of other potential stations. As such, although three general stations are depicted in FIG. 1, system 10 may be comprised of additional stations. In addition, the three depicted stations are exemplary, and system 10 may also have fewer stations such as, for example, two stations. Moreover, each of the general stations may be comprised of various stations. For example, the components depicted by reference numerals 20a-i and 27 may each be considered a station. In an exemplary aspect, system 10 of FIG. 1 may be part of system 2 depicted in FIG. 7 or system 800 depicted in FIG. 8.

Prior to being assembled, shoe parts 11a-f may be maintained at a part-loading station 27. Part-loading station 27 may be a motionless surface, such as a table or workbench, from which parts are transferred to part-feeding apparatuses 20a-i. For example, parts 11a-f may be manually loaded onto part-feeding apparatuses 20a-i. In addition, part-loading station 27 may be comprised of a conveyor belt or other automated apparatus for moving parts. For example, part-loading station 27 may move parts 11a-f onto part-feeding apparatuses 20a-i in an automated manner. Parts 14a-h are depicted on part-feeding apparatuses 20a-i and illustrate parts that may have been automatically or manually transferred from part-loading station 27.

Parts 11a-f and 14a-h may be cut or otherwise prepared to be incorporated or assembled into another shoe part. For example, in one aspect parts 11a-11f and 14a-h may have been automatically cut from a stock material using an automatic-cutting tool. An exemplary automatic-cutting tool may comprise a sharp edge that is shaped to match an outline of a shoe part and that is pressed into a stock material. When an automatic-cutting tool is used, system 10 may derive a part identity, part location, a part rotation, and/or a part size from the automatic-cutting tool. For example, an automatic-cutting tool may record a size and shape of the cutting pattern used to create the shoe part and communicate the recorded information to system 10, thereby apprising the system 10 of the identity and/or size of the cut shoe part. Moreover, an automatic-cutting tool may record a location at which a cutting step was executed, as well as a rotation of a cutting instrument when the cutting step was executed, and communicate this recorded information to system 10, thereby informing the system 10 of the orientation (e.g., coordinate position and rotation) of the cut shoe part within the system. In an exemplary aspect, this part-identity information and part-orientation information, which may be derived from a cutting tool, may be used to determine a position at which system 10 places a part and attaches a part.

In a further aspect, system 10 may be used to combine parts 11a-f and 14a-h in a manner depicted by parts 12a-e. As such, shoe parts 11a-f, 12a-e, and 14a-h may be comprised of a single part or of a plurality of assembled parts. For example, shoe parts 11a-f, 12a-e, and 14a-h may be comprised of one or more layers of flexible material, such as textile (e.g., knit, woven, embroidered), leathers, thermoplastic polyurethane, materials, etc. Shoe parts 11a-f, 12a-e, and 14a-h may be physical structures of a completed shoe and/or components thereof, such as an adhesive (or other attachment means) that may be used to join shoe components during a shoe manufacturing process. In one exemplary aspect, shoe parts 11a-f, 12a-e, and 14a-h represent different pieces of a shoe upper that are assembled prior to molding the shoe upper for attachment to other shoe parts. The shapes and combinations depicted by shoe parts 11a-f, 12a-e, and 14a-h are merely exemplary.

As indicated system 10 also may be comprised of part-feeding stations 20a-i, which make parts available to be used in a shoe-manufacturing process. For example, parts 11a-f may be loaded (e.g., illustrated by arrows 25a-c) onto part-feeding stations 20a-i from part-supply station 27. Part-feeding stations 20a-i may be fixed stations that support shoe parts in a stationary position to be either manually or automatically retrieved. For example, stations 20a-i may comprise tables, workbenches, or other motionless support elements. As such, parts may be placed on these fixed stations in a part-pickup zone (e.g., 29) to be either manually or automatically retrieved, such as with a pickup tool. Alternatively, stations 20a-i may be comprised of feeding apparatuses (e.g., conveyors) that move parts, which are loaded from part-supply station 27, into a part-pickup zone (e.g., 29), from which parts are either manually or automatically transferred. If information that describes a part has been recorded, such as an identity, size, and orientation, this information may be passed along with the part as it travels from one position to the next within system 10. For example, if a part-feeding station is comprised of a conveyor system, a known movement pattern of the conveyor system may be combined with an initial position of a shoe part (e.g., as determined by an automatic cutting tool) to determine a subsequent position to which the part has been moved by the conveyor system.

System 10 may transfer shoe parts from part-feeding stations 20a-i in various manners. In one aspect, shoe parts may be manually transferred from part-feeding stations 20a-i. For example, shoe part 12a may have been manually placed on tray 21b in a position that allows shoe-manufacturing apparatus 16a to act on shoe part 12a. In addition, shoe part 14a may be manually placed on top of shoe part 12a to allow shoe parts 12a and 14a to be assembled. Alternatively, shoe parts may be transferred from part-feeding stations 20a-i in an automated manner, such as by using shoe-manufacturing apparatuses 16a-c. For example, shoe-manufacturing apparatus 16a may have transferred shoe part 12a from part-feeding station 20a onto tray 21b. Shoe-manufacturing apparatus 16a may also transfer part 14a onto part 12a and then attach part 14a onto part 12a.

Shoe-manufacturing apparatuses 16a-c may be comprised of various components or tools that are used to carry out various shoe-manufacturing steps, such as picking up, transferring, positioning, placing, attaching, spraying, cutting, coloring, printing, etc. FIG. 1 depicts circles 32a-c that represent exemplary operating areas in which shoe-manufacturing apparatuses 16a-c may move and carry out various functions. Moreover, shoe-manufacturing apparatuses 16a-c, as well as tools that may be incorporated therein, may manipulate and act on shoe parts in an automated manner. For example, shoe-manufacturing apparatuses 16a-c may carry out automated steps based on information that is communicated to apparatuses 16a-c and that described characteristics (e.g., identity, position, rotation, etc.) of the shoe parts. Moreover, the term "shoe-manufacturing apparatus" describes an apparatus that may manufacture shoes, shoe parts, or a combination thereof. As such, the terms "shoe-manufacturing apparatus," "shoe-part-manufacturing apparatus," and "part-manufacturing apparatus" may be used interchangeably throughout this disclosure and the claims that follow.

Shoe-manufacturing apparatuses 16a-c may be comprised of various tools that are arranged at various positions on moveable extensions or arms. Exemplary arms or extensions may be multi-axis and may move in various planes or directions in order to position a tool to operate on a shoe part. For example, apparatuses 16a-c may be comprised of a set of a 4-axis arm extensions (e.g., multiple axis of movement/rotation) or a set of 6-axis arm extensions.

In a further aspect, a variety of different tools may be integrated with apparatuses 16a-c. For example, apparatuses 16a-c may be comprised of an automatic cutting tool that is used to cut a shoe part from a stock material. As previously described, an exemplary automatic cutting tool may be comprised of a sharp edge that is pressed into the stock material. Moreover, information derived from the automatic cutting tool may be communicated to the apparatuses 16a-c to apprise the apparatus of the part identity, location, size, orientation, etc. Apparatuses 16a-c may also be comprised of a pick-up tool that functions to pick up a shoe part from a part-feeding apparatus. For example, a pick-up tool may apply a pick-up force, such as by applying suction, grasping, gripping, adhering, scooping, etc. In one aspect, a cutting tool and a pick-up tool may function in a cooperative manner. For example, once a cutting tool has executed a cutting pattern in a stock material to form a shoe part, a part-pickup tool may apply a pickup force (i.e., negative pressure, electrostatic adhesion) to the shoe part and/or a force against the stock material to separate the formed shoe part from the stock material.

In an exemplary aspect, system 10 may comprise a part-recognition system that determines characteristics of some or all of the various parts being manipulated. For example, the part-recognition system may determine characteristics of parts that are loaded onto a part-feeding station 20a-i, that are picked up by a shoe-manufacturing apparatus 16a-c, or that have already been transferred onto surfaces 18a-d or trays 21a-b. Exemplary characteristics that may be determined by the part-recognition system may be a part identity, a part location within the operating area (e.g., circle 32), an amount of part rotation within the operating area, a placement location within the operating area to which a part will be transferred, and an attachment location within the operating area at which a part will be attached to another part.

System 10 may comprise more than one part-recognition system, such that each part-recognition system determines characteristics of a particular grouping of parts. For example, a first part-recognition system may determine characteristics of parts located within area 32a, whereas a second part-recognition system may determine characteristics of parts located within area 32b. Accordingly, the multiple part-recognition systems may communicate with one another as parts move from one station to another. Alternatively, system 10 may be comprised of a single part-recognition system that determines characteristics of parts in each of the areas 32a-c. In an exemplary aspect, at least a portion of a part-recognition system comprises a computing device that executes computer instructions. For example, the computer instructions may be stored in a computer storage media and executed by a processor of the computing device.

The part-recognition system may comprise image recorders 34a-i (e.g., cameras or video recorders) positioned throughout system 10. Image recorders 34a, 34d, and 34g represent below-mounted recorders, which may capture images of parts held being transferred by shoe-manufacturing apparatuses 16a-c. In addition, image recorders 34b, 34e, and 34h represent above-mounted recorders, which may capture images of parts positioned above on surfaces 18a-d or trays (e.g., 21a and 21b). Moreover, image recorders 34c, 34f, and 34i represent an apparatus-mounted recorder, which is mounted to a respective one of shoe-manufacturing apparatus 16a. Recorders 34c, 34f, and 34i may record images of parts positioned at part-feeding stations 20a-i or that have already been transferred. Recorders 34a-i and their respective positions are merely exemplary, and system 10 may comprise more or fewer recorders that are arranged in different positions.

In one exemplary aspect, the part-recognition system derives information from the recorded images. For example, an identity of a part may be derived from an image by applying a part-recognition protocol. In addition, an orientation (e.g., position and amount of rotation) of a part with respect to a work area 32a-c may be derived. Such information may be used to determine placement position of parts, as well as attachment positions. Accordingly, the placement position and attachment positions may be used to instruct shoe-manufacturing apparatus 16a-c.

In another exemplary aspect, various light-emitting devices 34 may be positioned throughout system 10. Light-emitting devices 34 may help to create a contrast between a part, which is being captured in an image, and an environment or background that surrounds the part. Such a contrast may assist the part-recognition system with determining a boundary and/or identity of the part. As such, light-emitting devices may be positioned to provide a back light behind a part or to illuminate a front surface of the part. In a further aspect, lasers may be positioned throughout system 10 and may function to project a laser line onto a shoe part. As such, images may be recorded that depict the projection of the laser line across the shoe part; the images are subsequently analyzed to derive shoe-part information.

In an exemplary aspect, each shoe-manufacturing apparatus 16a-c may be comprised of movable arms 26a-b, which may rotate or extend/retract to enable the apparatus to reach a desired position. Arms 26a-b are generally depicted as connected by a single joint; however, arms 26a-b may be comprised of multiple articulations that enable each arm to move in a variety of directions.

Moreover, each shoe-manufacturing device may have a part-pickup tool 24a-c, which is capable of picking up one or more parts from a part-feeding station 20a-i. Exemplary part-pickup tools may pick up the one or more shoe parts by applying various techniques, such as grasping, applying suction, adhering (e.g., surface tact, electro-adhesion), scooping, etc. The part-pickup tool 24a-c, like other pickup tools provided herein, are capable of capturing, moving, and releasing a part at determined positions/locations. The pickup tools may use any pickup force or combination of pickup force. The pickup tools may have zonal activations/deactivation of one or more pickup forces in zones of a common pickup tool. The zonal operation may be controlled by a computing device and/or an operator. In another aspect, characteristics of a shoe part may help to facilitate picking up the shoe part. For example, a shoe part may have a tab or other structure with which a part-pickup tool engages. In another example, a shoe part may have a pre-laminated film or other composition that provides an amount of tackiness or stickiness, which may provide a releasable adherence to the pickup tool. Accordingly, once the part-recognition system has notified a shoe-manufacturing apparatus of a shoe-part position on part-feeding station 20a-i, the part-pickup tool 24a-c may be used to pick up the shoe part from that shoe-part position.

In a further aspect, each part-pickup tool is capable of releasing a part when the part is positioned at a desired location, such as on top of part 12a. Releasing a part may be passive, such as by simply releasing a pickup force, such as grip, suction, adhesion, or other holding technique. The passive release of a part may be assisted by a degree of suction (i.e., negative pressure) applied to the underneath of the trays 21a-e which helps to "capture" the part after it has been released. In addition, releasing a part may be more active, such as by applying a force (e.g., physical separation from the pickup tool) or pressure (e.g., blown air) against the released part and towards the element onto which the released part may be positioned. Accordingly, once the part-recognition system has notified a shoe-manufacturing apparatus of a placement position at which a shoe part should be placed, the part-pickup tool 24a-c may be used to release the shoe part at that placement position.

Part-pickup tools 24a-c may each have a same design, or respective designs may vary between apparatuses. For example, pickup tool 24a may be different from both pickup tools 24b and 24c. In one aspect, pickup tools 24a-c are selected and implemented based on characteristics of shoe part that will be made available at a part-feeding station 20a-i. Exemplary characteristics that may determine a type of pickup tool are size, shape, weight, profile, material, porosity, environmental conditions (e.g., temperature, humidity) etc. For example, if parts 12a and 14a are bigger than other parts manipulated in system 10, such as parts 14b-f, pickup tool 24a may be designed to pickup larger shoe parts and pickup tool 24b may be designed to pickup smaller shoe parts. Moreover, part-pickup tools 24a-c may be a combination of part-pickup tools, such that each tool of the combination is designed to pick up a different sized shoe part. For example, a part-pickup tool may have one tool configuration (e.g., size, pickup force type) that picks up larger shoe parts and another tool configuration that picks up smaller shoe parts, such that the part-pickup tool may be considered a hybrid part-pickup tool. For example, the pickup tool may leverage a hybrid, or multiple, of pickup forces in a common pickup tool. Additionally, a zonal pickup tool configuration may be used. For example, for a first part a first set of zones on the pickup tool may be activated to capture the first part. The same pickup tool may activate different zones for a second part to be captured. The determinations of zones to be activated may be influenced by the part size, shape, material, weight, and/or position. Further, the zonal configuration of the pickup tool may be manipulated such that a first pickup force is used in a first zone while a second pickup force (e.g., a different pickup force type) is used in a second zone.

In a further aspect, each shoe-manufacturing apparatus 16*a-c* may comprise a part-attachment tool 30*a-c*, which operates to attach shoe parts to one another. For example, a part-attachment tool 30*a* may attach part 14*a* onto part 12*a* after part 14*a* has been placed onto part 12*a*. Various attachment methods and techniques may be applied by part-attachment tools 30*a-c*, such as adhering, stitching, sonic welding, heat press, cold press, etc. Moreover, each part-attachment tool may have a different configuration based on the parts to be coupled. That is, part-attachment tool 30*a* may have a different configuration than part-attachment tool 30*b*. As such, in an exemplary aspect, once the part-recognition system has determined a part-attachment location, a part-attachment tool 30*a-c* may be used to attach shoe parts in an automated manner. In one aspect, the shoe parts are temporarily attached in order to maintain positioning for downstream processing.

FIG. 1 depicts that shoe parts 12*a-e* may be moved through a series of manufacturing processes by which other shoe parts (e.g., 14*a-h*) may be added thereto. For example, shoe parts 12*a-e* may be flatly arranged on surfaces 18*a-d*, such that shoe parts 14*a-h* are placed on an upper facing surface of shoe parts 12*a-e*. That is, in an exemplary aspect, shoe-manufacturing apparatuses 16*a-c* may be used to place shoe part 12*a* onto surface 18*a* or tray 21*b* and to position shoe parts 14*a-h* respective to shoe part 12*a*.

As depicted in FIG. 1, system 10 may be comprised of one or more part-support surfaces 18*a-d*, which may support shoe parts 12*a-e* when the shoe parts are positioned to be acted upon by shoe-manufacturing apparatuses 16*a-c*. For illustrative purposes, arrows 19*a-c* are depicted to indicate a possible direction in which shoe parts are moved from one shoe-manufacturing apparatus to another. Accordingly, stations may be set up along the path depicted by arrows 19*a-c*.

Part-support surfaces 18*a-d* may be comprised of various non-moving surfaces, such as tables or workbenches. As such, parts 12*a-e* may be manually transferred from one position to the next to be sequentially acted upon by part-manufacturing apparatuses. In addition, part-support surfaces 18*a-d* may be comprised of a series of movable surfaces, such as conveyors that transfer shoe parts from one position to a next in an automated manner. The rectangular path of surfaces 18*a-d* depicted in FIG. 1 is merely exemplary, and surfaces 18*a-d* may be arranged in any configuration, which may be comprised of more or fewer surfaces.

System 10 may also comprise support trays 21*a-b* onto which shoe parts are placed. Trays 21*a-b* may be helpful in various instances. For example, a tray may help facilitate transfer of a shoe part from one moving conveyor 18*d* to another moving conveyor 18*a*. In addition, a tray may have various features that assist to hold a shoe part in a desired position. For example, a top side of a tray may have an amount of tackiness that helps to prevent a shoe part from sliding. In addition, a top side of a tray may receive pins or other temporary fasteners, which are positioned through the shoe part to hold the shoe part in place. In another aspect, a tray may have a series of apertures spaced throughout, such that a suction force, which is generated on an underneath side of the tray, may be applied to a shoe part positioned on a top side of the tray. A suction force utilized in such a manner (i.e., on the underneath side of tray) may help to hold a shoe part in a desired position when the shoe part is being acted upon by a shoe-manufacturing apparatus 16*a-c*. As well, the suction force may be utilized to assist in the passive release of a shoe part by shoe-manufacturing apparatuses 16*a-c*.

In an exemplary aspect, steps taken to secure a shoe part to a tray may be timed and executed in coordination with a release or placement by part-pickup tool 24*a-c*. That is, as previously described, part-pickup tool 24*a-c* may passively release a shoe part, or may actively apply a force or pressure against a shoe part, in order to place a shoe part at a desired position. Accordingly, a suction or other implementation applied to a tray to hold a shoe part in position on the tray may be timed to allow the shoe part to be passed off from the part-pickup tool to the tray.

As previously described, system 10 may be comprised of one or more assembly stations, which are arranged in an assembly line that may be at least partially automated. FIG. 1 depicts three exemplary stations, as well as a box 5 that represents a placeholder for other potential stations. As such, although only three stations are depicted in FIG. 1, system 10 may comprise additional stations. In addition, the three depicted stations are exemplary, and system 10 may also comprise fewer stations.

System 10 may further be comprised of one or more heat presses 70 and one or more cold presses 72. The heat presses 70 and cold presses 72 may be arranged in any order to carry out desired shoe-part assembly. For instance, heat presses 70 and cold presses 72 may be aligned on either side part-support surfaces 18*a-d* to facilitate faster assembly. Heat applied by heat press 70 may further activate adhesive elements positioned among a compilation of parts that comprise shoe part 12*e*. By applying pressure to both part 12*e* and the heat activated elements, the compilation of parts may be pressed into a more compact layer of shoe parts. Applying a cold press 72 to part 12*e* after heat press 70 may then cause the adhesive elements to solidify and/or set, thereby holding the compilation of parts together.

System 10 may comprise a variety of other 74 manufacturing apparatuses or stages. For example, system 10 may comprise a quality control station that enables manual or automated inspection of shoe parts. System 10 may also comprise a station at which part 12*e* is assembled with or attached onto another shoe part. Moreover, system 10 may comprise a station at which shoe part 12*e* is buffed, molded, cut, decorated, and/or further processed.

In a further aspect, station 74 may represent a removal of a shoe part from surface 18*a-d* or from a tray (e.g., 21*a-b*). For example, a part may be removed to be stacked with other similar parts or to be transferred to another shoe-part manufacturing system, which executes other shoe-manufacturing processes. As such, a shoe part may be lifted off of a tray (e.g., 21*a-b*) at station 74. In an exemplary aspect, a shoe part may be constructed using a type of hot melt, which may stick to a tray or other surface that supports the shoe part. As such, trays 21*a-b* may have a mechanism or feature to secure or fix the trays 21*a-b* to surface 18*a-d* and to help prevent a shoe part from sticking to the tray. In an exemplary aspect, a tray may have a flange or other structural element that may be used to hold the tray down (i.e., against a support surface such as 18*a-d*) when a shoe part is picked up off the tray.

Various methods and steps may be performed by system 10. Generally, a first shoe part 12*a* may be positioned on a support surface 18*a* or 21*b* and at a first manufacturing station, wherein the first shoe part is substantially flat on the support surface. In addition, a first automated part pickup tool 24*a* may place a second shoe part 14*a* on top of the first shoe part, and a first automated attachment tool 30*a* may attach the second shoe part to the first shoe, thereby forming an assembly (e.g., 12*b*) of the first shoe part and the second shoe part. As used throughout this application, the term "attach" may mean permanent attachment or temporary attachment in order to maintain positioning for downstream processing. In a further step, the assembly is moved to a second manufacturing station (as depicted by part 12*b*), such that a second automated part pickup tool 24*b* places a third shoe part 14*b* or 14*c* on top of the assembly 12*b* of the first shoe part and the second shoe part. Subsequently, a second automated attachment tool 30*b* may attach the third shoe part to the assembly of the first shoe part and the second shoe part.

Other methods may also be performed by system 10. For example, support surface 18*a-d* (e.g., conveyor) may move a tray 21*a-b* into position to receive a shoe part (e.g., 12*a*). A part-recognition system may identify part 12*a* and determine a location and orientation of part 12*a* within area 32*a*. Based on the location and orientation, a placement position and attachment position of other shoe parts may be determined. The part-recognition system may determine an identity, location, and orientation of part 14*a*. Part 14*a* may be picked up by tool 24*a*, transferred by parts 26*a-b* to the placement position, and attached at the attachment position by tool 30*a*. Part 12*b* provides an exemplary illustration of part 12*a* and part 14*a* assembled into a shoe part.

Once assembled, shoe part 12*b* may be transferred by surface 18*a-d* to another position near shoe-manufacturing apparatus 16*b*. As such, part-recognition system may determine an identity of part 12*b* and an orientation and location of part 12*b* within area 32*b*. Based on the identity, location, and orientation, respective placement positions and respective attachment positions of other shoe parts 14*b-e* may be determined. The part-recognition system may determine an identity and orientation of parts 14*b-e*. Parts 14*b-e* may then be sequentially picked up by tool 24*b*, sequentially transferred to the respective placement positions, and sequentially attached at the respective attachment positions by tool 30*b*. Part 12*c* provides an exemplary illustration of part parts 12*b* and 14*b-e* assembled into a shoe part. Shoe part 12*c* may be transferred to subsequent stations (e.g., near shoe-manufacturing apparatus 16*c*) to be manipulated and assembled to together with additional parts (e.g., 14*g* and 14*h*). For example, shoe part 12*e* provides an exemplary illustration of an assembly including parts similar to 12*a* and 14*a-h*.

Figure 2:
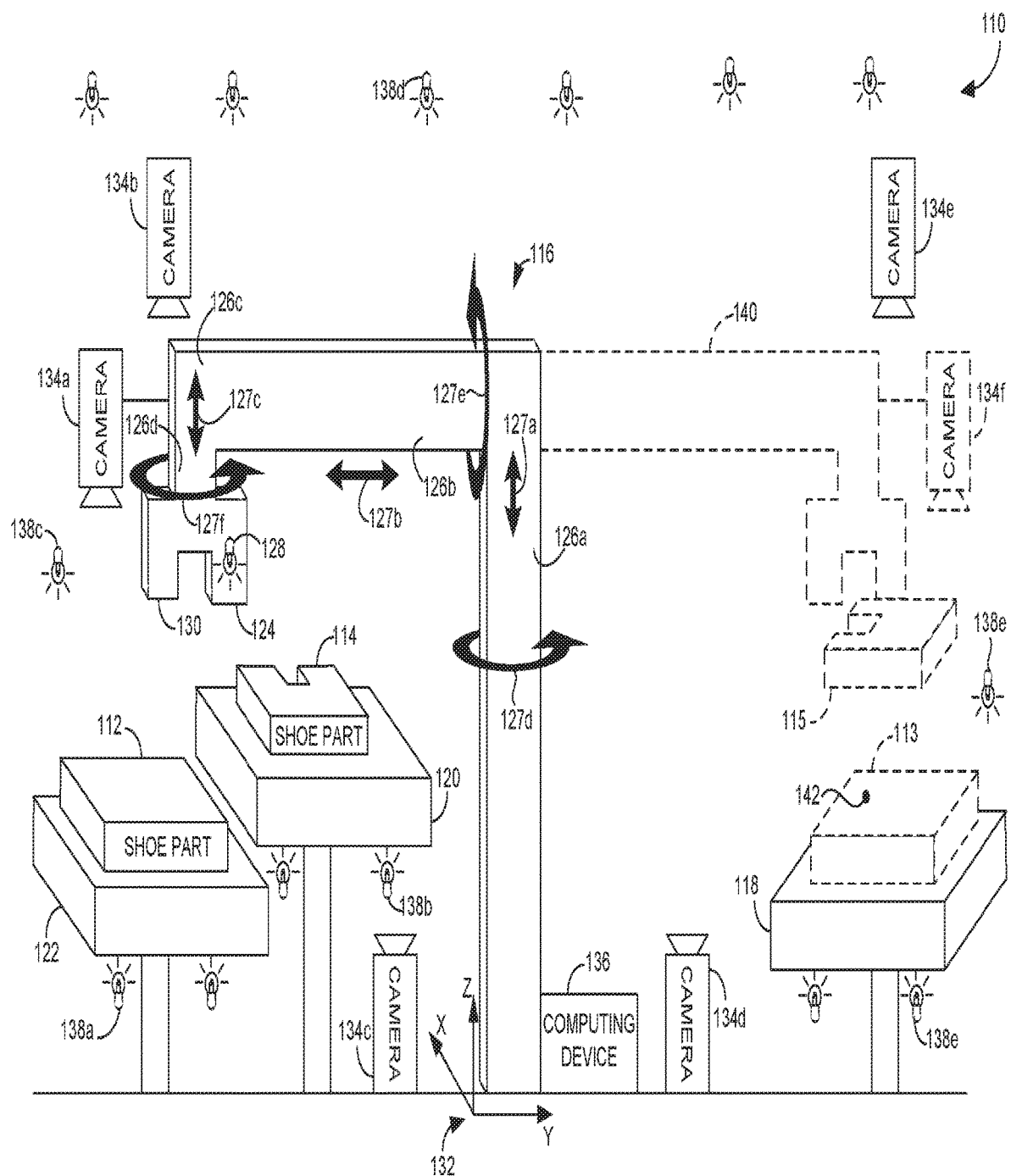

Referring now to FIG. 2, a depiction is provided of a system 110 in which various shoe-manufacturing processes may be performed. System 110 is comprised of various automated manufacturing apparatuses and tools, which may function to, among other things, position and assemble shoe parts. For example, shoe parts 112 and 114 may be transferred by shoe-manufacturing apparatus 116 and assembled. Whereas FIG. 1 depicts multiple shoe-manufacturing apparatuses 16*a-c*, FIG. 2 depicts a single shoe manufacturing apparatus 116. As such, system 110 of FIG. 2 may be a station within a larger system 10 of FIG. 1. For example, shoe-manufacturing apparatus 116 of FIG. 2 may perform functions of shoe manufacturing apparatus 16*a* depicted in FIG. 1.

Elements in FIG. 2 may be relatively generically represented so as to fit into the context of the schematic diagrams of FIG. 2 and into the description provided herein. For example, shoe parts 112 and 114 and apparatus 116 are relatively generic shapes, which are provided for exemplary and explanatory purposes. However, these elements may be comprised of various other shapes, sizes, configurations, etc. and still may be consistent with FIG. 2 and the description provided herein. For example, parts 112 and 114 may be similar to parts 12*a* and 14*a* depicted in FIG. 2.

Accordingly, shoe parts 112 and 114 may comprise the same or different types of flexible material, such as textile (e.g., knit, woven, braided, embroidered), leathers, thermoplastic polyurethane materials, etc. Shoe parts 112 and 114 may be physical structures of a completed shoe and/or components thereof, such as an adhesive (or other attachment means) that may be used to join shoe components during a shoe manufacturing process. In one exemplary aspect, shoe parts 112 and 114 represent different pieces of a shoe upper that are assembled prior to molding the shoe upper for attachment to other shoe parts.

FIG. 2 depicts that system 110 may be comprised of various manufacturing stations, such as a first manufacturing station 118, a second manufacturing station 120, and a third manufacturing station 122. A manufacturing station may serve various functions, such as storing shoe parts, making shoe parts available to be retrieved by other tools, and supporting shoe parts that are being assembled. For example, the second manufacturing station 120 and the third manufacturing station 122 may make shoe parts 114 and 112 available to be retrieved and transferred to the first manufacturing station 118. Moreover, the first manufacturing station 118 may function as an assembly station at which shoe parts 112 and 114 are assembled. While only one part is depicted at stations 120 and 122, each station may also support multiple parts at the same time. As such, stations 118, 120, and 122 of FIG. 2 may perform functions of support surface 18, feeding station 20*a* and feeding station 20*b/c* (respectively) of FIG. 1.

A manufacturing station may be comprised of various manufacturing support apparatuses. For example, a manufacturing station may comprise a fixed support surface, such as a table, bench, etc. In addition, a manufacturing station may comprise a movable support surface that transfers one or more shoe parts from one location to another location. A conveyor apparatus having a conveyor belt is an example of a movable support surface. For example, stations 120 and 122 may comprise conveyor apparatuses that move shoe parts 112 and 114 to a retrieval area, from which shoe parts 112 and 114 are acquired by shoe-manufacturing apparatus 116. Moreover, station 118 may comprise a conveyor apparatus that moves one or more shoe parts along an assembly line, thereby allowing the one or more shoe parts to undergo various shoe-manufacturing steps (e.g., assembly, molding, pressing, quality control, etc.).

System 110 may have other shoe-manufacturing apparatuses and tools, such as shoe-manufacturing apparatus 116, which may comprise tools 124, 126*a-d*, 128, and 130 that are described below. Shoe-manufacturing apparatus 116 may function in various capacities. For example, shoe-manufacturing apparatus 116 may pick up shoe parts 112 and 114 and transfer the shoe parts 112 and 114 to various positions. In one exemplary aspect, shoe parts 112 and 114 may be moved into a field of view of a camera (e.g., 134*c* or 134*d*). Moreover, shoe parts 112 and 114 may be transferred to another manufacturing station.

As such, shoe-manufacturing apparatus 116 may be comprised of multiple tools that are integrated into a single shoe-manufacturing apparatus. Each of the multiple tools that comprise shoe-manufacturing apparatus 116 may serve one or more respective functions, such that the multiple tools cooperatively operate to execute tasks of the shoe-manufacturing apparatus 116. In an exemplary aspect, shoe-manufacturing apparatus 116 comprises a pick-up tool 124, a part-transfer tool 126a-d, a light-emitting tool 128, and/or a part-attachment tool 130. As already indicated, the depictions of each of these tools 124, 126a-d, 128, and 130 may be generic, such that each tool may comprise alternative shapes, sizes, configurations, and components in accordance with more specific aspects of the present invention.

An exemplary part-pickup tool 124 may function to pick up one or more parts from a manufacturing station. Accordingly, a part-pickup tool 124 may pick up the one or more parts by manipulating or working on the parts in various manners, such as by grasping or gripping, scooping, adhering, and/or applying a suction force to the part. As such, a part-pickup tool 124 may comprise various components that function to carry out a desired manner of temporarily picking up a part, retaining a part while the part is being moved, and releasing the part when the part is positioned at a desired position. For example, a part-pickup tool 124 may comprise a robotic claw that functions to grip or grasp a shoe part. Alternatively, an exemplary part-pickup tool 124 may comprise a vacuum tool, which applies a suction force (i.e., negative pressure) to the part that is sufficient to pick up the part. In another aspect, part-pickup tool 124 may comprise electromagnetic components, tacky, and/or adhesive components (e.g., electrostatic adhesion).

In one aspect, the part-pickup tool 124 comprises a part-pickup tool described in U.S. patent application Ser. No. 13/299,890, which is titled MANUFACTURING VACUUM TOOL, and is incorporated in its entirety herein by reference. For example, the part-pickup tool 124 may comprise a plate having a plurality of apertures as depicted in FIGS. 1 and 5-15 of U.S. application Ser. No. 13/299,890. Furthermore, part-pickup tool 124 may function to pickup shoe parts having a variety of characteristics or combinations of characteristics, such as rigid, malleable, porous, non-porous, etc. Moreover, part-pickup tool 124 may be functional to pick up and position a part constructed, at least in part, of leather, polymers, textiles, rubber, foam, mesh, and/or the like. In a further aspect, a part is comprised of a pre-laminated composition (e.g., hot melt) that helps to facilitate adherence of the part to the part-pickup tool when the part pickup tool picks up, transfers, and places the part.

An exemplary part-transfer tool 126a-d may function to transfer and position various items throughout system 110. In an aspect of the invention, an exemplary part-transfer tool 126a-d may transfer and position other tools (e.g., part-pickup tool 124 and part-attachment tool 130) that may be integrated with part-transfer tool 126a-d into shoe-manufacturing apparatus 116. For example, part-transfer tool 126a-d may position part-pickup tool 124 in an orientation relative to stations 120 and 122 that enables part-pickup tool 124 to pick up a shoe part. In another example, part-transfer tool 126a-d may position part-attachment tool 130 in an orientation relative to station 118 that enables part-attachment tool to couple shoe parts positioned at station 118. In another aspect of the invention, a part-transfer tool 126a-d may transfer a shoe part that has been picked up by part-pickup to 124 to another position. For example, when part-pickup tool 124 picks up either part 112 or 114, part-transfer tool 126a-d may maneuver to enable part 112 or 114 to be positioned at station 118.

Arrows 127a-f are depicted in FIG. 2 to illustrate exemplary directions in which part-transfer tool 126a-d may move. As such, part-transfer tool 126a-d may move back and forth in a direction of arrows 127a-c and may move rotationally in a direction of arrows 127d-f. Arrows 127a-f are exemplary only. Accordingly, a part-transfer tool 126a-d may transfer a part in various manners, such as by employing a combination of telescoping members, hydraulic arms, and/or articulating joints. Moreover, part-transfer tool 140 is depicted in broken lines to illustrate another position to which part-transfer tool 126a-d may move, such as when the part-transfer tool moves a shoe part from station 120 or 122 to station 118.

An exemplary light-emitting tool 128, which is integrated with shoe-manufacturing apparatus 116, may function to illuminate at least a portion of a shoe part. For example, Light-emitting tool 128 may function as a front light that illuminates shoe parts 112 and 114 when each is positioned at a respective station. Moreover, light-emitting tool 128 may function as a back light that illuminates a shoe part acquired and held by part-pickup tool 124. Other descriptions of exemplary characteristics and purposes of a light-emitting tool or device are provided in U.S. application Ser. No. 13/299,856, which is titled AUTOMATED IDENTIFICATION OF SHOE PARTS, and is incorporated by reference herein in its entirety. For example, system 110 may also comprise light-emitting devices 138a-f, which are described in more detail below.

An exemplary part-attachment tool 130 may function to attach one or more shoe parts onto another shoe part. As such, a part-attachment tool 130 may comprise components that function to carry out a desired manner of attaching a part, such as by stitching, adhering, welding, heat pressing, and/or any other attachment method that is suitable to attach shoe parts. For example, a part-attachment tool 130 may comprise an automatic sewing tool that functions to make a stitch at a desired location on parts to be connected. Alternatively, an exemplary part-attachment tool 130 may comprise an ultrasonic-welding tool, which applies a frequency to the part that is sufficient to weld the part to another part. In another aspect, an exemplary part-attachment tool 130 may apply a heat weld or press.

In one aspect, the part-attachment tool 130 may comprise a part-attachment tool described in U.S. patent application Ser. No. 13/299,908, which is titled MULTI-FUNCTIONAL MANUFACTURING TOOL, and is incorporated in its entirety herein by reference. For example, the part-attachment tool 130 may comprise an ultrasonic welder that is identified by reference numeral 200 and is depicted in various figures of said U.S. application Ser. No. 13/299,908. Accordingly, the part-attachment tool 130 and the part-pickup tool 124 may be combined as an integrated functional unit.

System 110 may also be comprised of a part-recognition system, which analyzes an image or scan of a shoe part to determine various characteristics of the shoe part. For example, the part-recognition system may analyze an image to determine a part's size, shape, color, thickness, identity, compliance with quality-control measures, position, rotation, distance from other parts, etc. Moreover, the part-recognition system may be used to instruct other shoe-manufacturing devices (e.g., 116) regarding a manner in which a part should be manipulated in a manufacturing process, such as by attaching the part to another part, rotating, cutting, buffing, coloring, printing, spraying, customizing, molding, etc. In an exemplary aspect, the part-recognition system may be used to determine an identity of a shoe part (e.g., 112 and/or 114), which is positioned at a manufacturing station (e.g., 118, 120, and/or 122), and to determine an orientation (e.g., geometric position and amount of rotation) of the shoe part within a dimensional coordinate system (two-dimensional (2-D) coordinate system and/or three-dimensional (3-D) coordinate system), which is identified by axes 132.

As such, an exemplary part-recognition system may be comprised of one or more image recorders 134a-f (e.g., cameras) that may be positioned throughout system 110 and may communicate with a computing device 136. When executing functions of the part-recognition system, an image recorder may record an image of a shoe part that depicts a 2-D representation of the shoe part and that is analyzed to derive various information. Image recorders 134a-f are exemplary only, and the number, location, and/or orientation of image recorders 134a-f may vary beyond the example illustrated in FIG. 2.

Part-recognition system may further comprise light-emitting tool 128, which was described above as a tool integrated into manufacturing apparatus 116, as well as light-emitting devices 138a-f. Light-emitting devices 128 and 138a-f may be utilized to provide a certain lighting effect to a shoe part when an image is recorded. For example, a light-emitting device may provide a contrast between a shoe part and a surrounding environment (e.g., background), thereby making a boundary of a shoe part easier to detect in an image.

Light-emitting devices 138a-f represent lighting devices (e.g., incandescent bulbs, fluorescent devices, LEDs, or any other device capable of emitting light) that may be positioned at various locations throughout system 110. As such, light-emitting devices 138a-f may be positioned to provide various lighting effects to a shoe part. Exemplary lighting effects may be a front light or a back light. For example, when shoe part 112 is at station 122, lighting device 138a may provide a back-light effect when a camera 134a or 134b records an image of the shoe part 112. Moreover, light-emitting device 138c may provide a front light to part 112 at station 122. The light-emitting devices 138a-f depicted in FIG. 2 are exemplary only, and the number, type, and position of light-emitting devices 138a-f may vary.

In an exemplary aspect, an image recorded by part-recognition system is communicated to computing device 136. Computing device 136 may help execute various operations, such as by analyzing images and providing instructions to shoe-manufacturing equipment. Computing device 136 may be a single device or multiple devices, and may be physically integral with the rest of system 110 or may be physically distinct from other components of system. Computing device 136 may interact with one or more components of system 110 using any media and/or protocol. Computing device 136 may be located proximate to or distant from other components of system 110.

In an exemplary aspect, computing device 136 may help analyze images and derive information therefrom. For example, information that computing device 136 derives from an image may comprise an identity of a shoe part and an orientation of the shoe part with respect to a 2-D geometric system. An orientation may comprise a geometric coordinate (e.g., x value and y value) in the 2-D geometric coordinate system, as well as an amount to which a shoe part is rotated in the 2-D geometric coordinate system.

In a further aspect, computing device 136 may use the image-derived information to instruct shoe-manufacturing apparatus 116, such as by notifying shoe-manufacturing apparatus 116 of a part orientation relative to the 2-D coordinate system 132 and of a new part orientation to which the shoe part should be transferred. For example, in system 110, shoe-manufacturing apparatus 116 may attach part 115 to part 113, both parts being depicted in a broken-line view. That is, part 112 and part 113 may be the same part that is depicted at two different positions in system 110, and part 114 and part 115 may be the same part that is depicted at two different positions in system 110.

Accordingly, computing device 136 may first determine an identity of part 112/113 and an orientation of part 112/113 at station 118. Based on the identity of part 112/113 and the orientation of part 112/113 at station 118, computing device 136 may determine an orientation 142 in the 2-D geometric coordinate system to which part 114/115 may be transferred. Moreover, computing device 136 may determine an attachment point at which part 114/115 is to be attached to part 112/113 by part-attachment tool 130. In addition, FIG. 2 illustrates that a rotation of part 114 may be different than a rotation of part 115, thereby depicting that the third orientation may comprise an amount of rotation in addition to a geometric coordinate.

As such, in an aspect of the invention, the part-recognition system may comprise some or all of the 2-D part-recognition system described in U.S. patent application Ser. No. 13/299,856, which is titled AUTOMATED IDENTIFICATION OF SHOE PARTS, and is incorporated in its entirety herein by reference.

Figure 4:
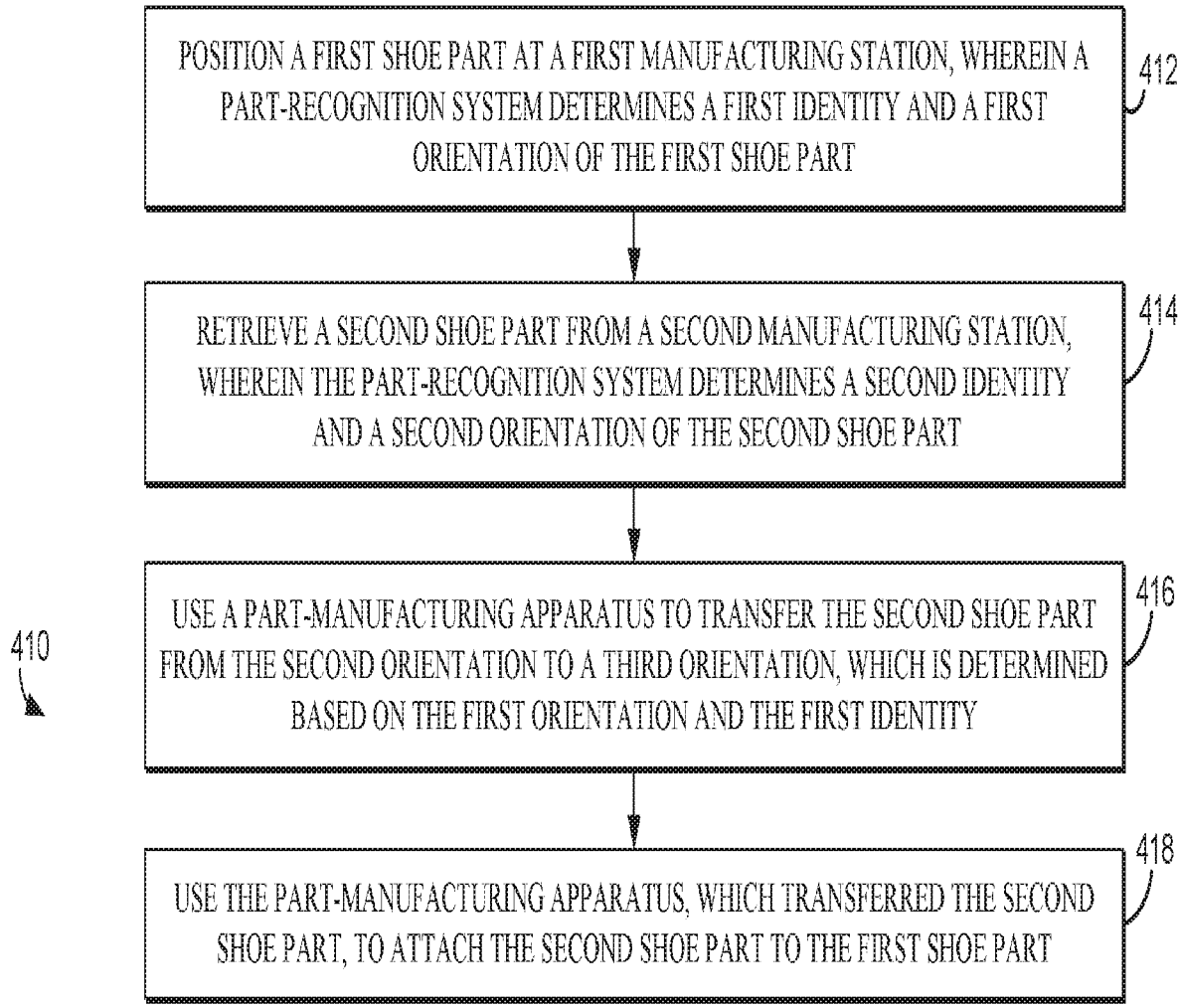
FIGS. 4 and 5 depict flow diagrams of respective methods of manufacturing shoe parts in an automated manner in accordance with the present invention.

Referring now to FIG. 4, a flow diagram depicts a method 410 of manufacturing a shoe part in an automated manner that may be carried out in system 110. In describing FIG. 4, reference is also be made to FIG. 2. In addition, method 410, or at least a portion thereof, may be carried out when a computing device (e.g., 136) executes a set of computer-executable instructions stored on computer storage media.

At step 412, method 410 may comprise positioning a first shoe part at a first manufacturing station, wherein a part-recognition system determines a first identity of the first shoe part and determines a first orientation of the first shoe part respective to a two-dimensional (2-D) geometric coordinate system. For example, shoe part 113 may be positioned at station 118, such as by a conveyor apparatus or by shoe-manufacturing apparatus 116. Part-recognition system may analyze an image of shoe part 113 to determine an identity of shoe part 113 and an orientation of shoe part 113 as positioned at station 118. As described above, the orientation of shoe part 113 may comprise a geometric coordinate and amount of rotation in 2-D geometric coordinate system 132. An image of shoe part 113 may be captured by any of cameras 134a-f, depending on where shoe part 113 is positioned when the image is captured.

Method 410 may also comprise at step 414, retrieving a second shoe part from a second manufacturing station, wherein the part-recognition system determines a second identity of the second shoe part and determines a second orientation of the second shoe part respective to the 2-D geometric coordinate system. For example, shoe part 114 may be retrieved by apparatus 116 either after an image of part 114 is recorded (e.g., by using camera 134a or 134b) or before an image of part 114 is recorded (e.g., by using camera 134c when apparatus 116 positions part 114 in a field of view of camera 134c). In either scenario, the image may be analyzed to determine a part identify of part 114 and a part orientation of part 114.

At step 416, the part-manufacturing apparatus may be used to transfer the second shoe part (e.g., part 114 that is also represented in broken lines as part 115) from the second orientation to a third orientation, which is determined based on the first orientation and the first identity. That is, as described above, once part 113 has been identified and located, part-recognition system may determine an orientation (e.g., 142) to which part 115 should be placed. Furthermore, at step 418, the part-manufacturing apparatus (e.g., 116), which transferred the second part, may be used to attach the second shoe part to the first shoe part.

Figure 3:
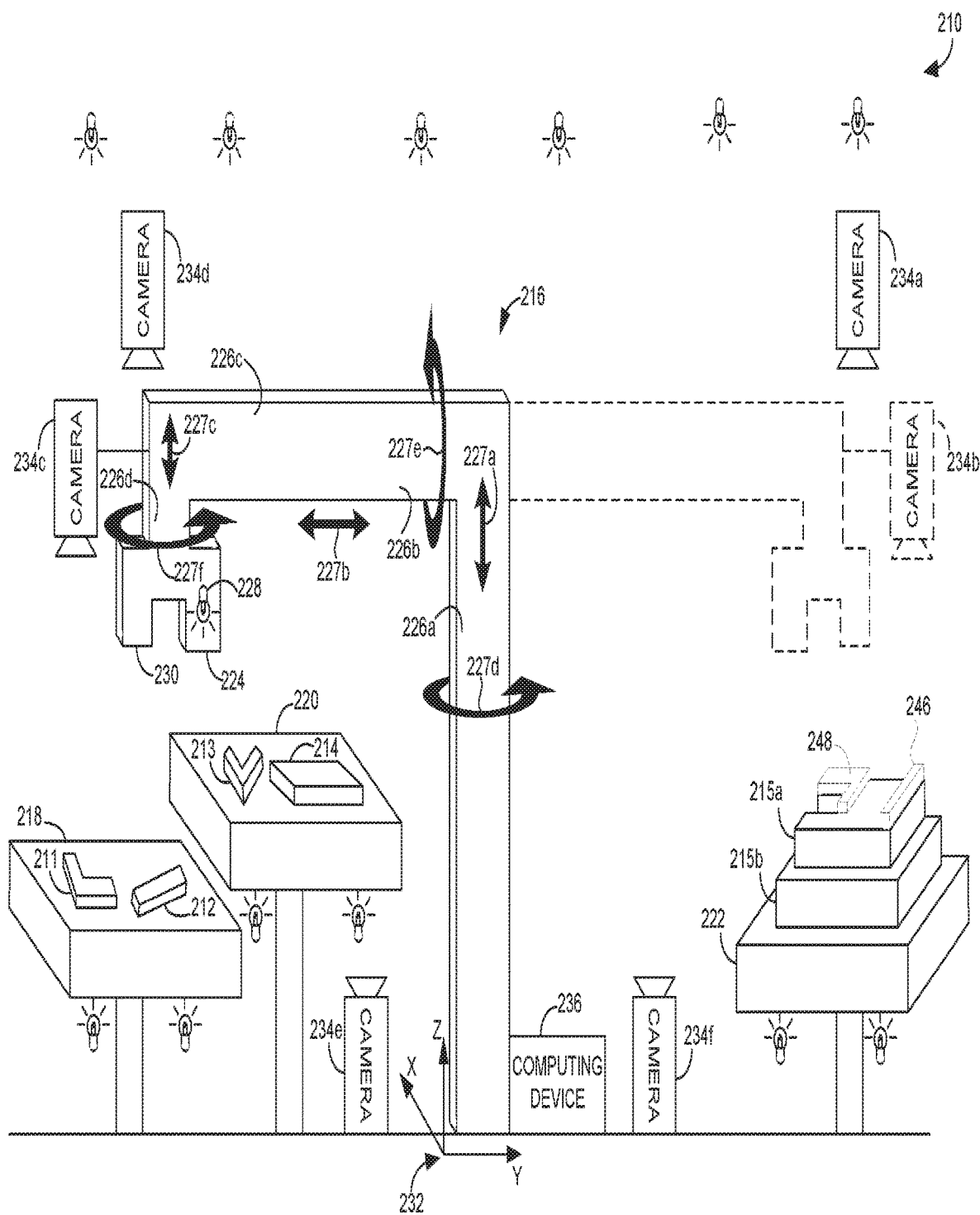

Referring to FIG. 3, another exemplary system 210 is depicted in which an automated shoe-manufacturing process may be carried out. System 210 is comprised of various automated manufacturing apparatuses and tools, which may function to, among other things, position and assemble shoe parts. For example, system 210 may function to transfer one or more shoe parts 211-214 from stations 218 and 220 to station 222. Moreover, system 210 may function to attach the one or more shoe parts 211-214 onto a shoe part 215*a-b* positioned at station 222. In these respects, shoe parts 211-214 may be similar to shoe parts 14*b-f* of FIG. 1. Moreover, stations 218 and 220 may be similar to stations 20*d-f* of FIG. 1, and station 222 may be similar to surface 18*a*.

Accordingly, whereas FIG. 1 depicts multiple shoe-manufacturing apparatuses 16*a-c*, FIG. 3 depicts a single shoe manufacturing apparatus 216. As such, system 210 of FIG. 3 may be a station within a larger system 10 of FIG. 1. For example, shoe-manufacturing apparatus 216 of FIG. 3 may perform functions of shoe manufacturing apparatus 16*b* depicted in FIG. 1. Moreover, system 210 may be comprised of some components that function similarly to system 110, such as various shoe-manufacturing stations, light-emitting devices, image recorders, and a shoe-manufacturing apparatus.

While system 110 and 210 may share similar components, components of system 210 may operate differently than elements described in system 110. For example, systems 110 and 210 may be arranged at different positions within system 10 (FIG. 1) and may be configured to assemble different shoe parts.

In FIG. 3, system 210 may comprise a shoe-manufacturing apparatus 216, which is similar to apparatus 116 depicted in FIG. 2. For example, shoe-manufacturing apparatus 216 may be comprised of a part-pickup tool 224, a part-transfer tool 226*a-d*, a light-emitting device 228, and a part-attachment tool 230, which execute respective functions in a cooperative manner to carry out tasks of apparatus 216. In addition, arrows 227*a-f* depict directions in which apparatus 216 may adjust and move to transfer tools or parts to various positions within system 210.

However, because shoe parts 211-214 may need to be processed differently than shoe parts 112 and 114 (of FIG. 2), tools associated with shoe-manufacturing apparatus 216 may function in a different manner than in apparatus 116. For example, shoe parts 211-214 may have different characteristics than shoe parts 112 and 114, such that system 210 comprises operations, functions, and components that are different than system 110. For example, shoe part 212 may be comprised of a different size, configuration, construction, purpose, etc. relative to shoe parts 112 or 114. As such, system 210 may pick up, transfer, attach, and execute manufacturing processes related to part 212 in a manner that is different than in system 110.

In an exemplary aspect, shoe parts 211-214 may be comprised of smaller dimensions than parts in system 110. As such, part-pickup tool 224 may comprise a single-aperture or dual-aperture vacuum tool, such as the exemplary tool depicted in FIG. 22 of previously mentioned U.S. application Ser. No. 13/299,890, which is titled MANUFACTURING VACUUM TOOL, and is incorporated in its entirety herein by reference. In another exemplary aspect, part-pickup tool 224 may comprise both a single- or dual-aperture vacuum tool, as well as a plate having a plurality of apertures. Such an exemplary hybrid part-pickup tool may function to pickup up parts having a range of sizes that is wider than a single- or dual-aperture tool or plate-style tool alone. In another aspect, part-pickup tool 224 and part-attachment tool 230 may be integrated into a single head.

In a further aspect of the invention, some or all of shoe parts 211-214 may be positioned at stations 218 and 220 in a manner that matches a configuration of the parts 211-214 when the parts are attached to a base part (e.g., 215*a*). As such, a pickup tool 224 may simultaneously pick up multiple parts in a manner that holds the parts in the configuration; transfers the parts while maintaining the configuration; and then places the parts on the base part while maintaining the configuration. For example, a plate-style pickup tool having multiple apertures may be used to pick up more than once part at a time, while maintaining the parts in a configuration. In another aspect, multiple single- or dual-aperture pickup tools may be used to pick up more than one part at a time.

Various techniques may be applied to arrange some or all of shoe parts 211-214 at stations 218 and 220 to match a configuration of the part when attached to a base. For example, shoe parts 211-214 may be cut using an automatic cutting tool that is programmed to cut the shoe parts in a pre-determined configuration. An exemplary automatic cutting tool may comprise a plurality of part-shaped dies that are arranged on the automatic cutting tool to match the pre-determined configuration, such that when the part-shaped dies are pressed into a stock material, the cut parts are arranged to match the pre-determined configuration. In another aspect, another part-manufacturing apparatus (e.g., similar to 216) may be used to place parts 211-214 at stations 218 and 220 in a pre-determined configuration.

In another aspect of the present invention, some or all of shoe parts 211-214 are moved from stations 218 and 220 and are attached to an assembly of parts 215*a-b*. As such, a part-recognition system of system 210 may execute a part-selection protocol, which determines an order in which the apparatus 216 is instructed to sequentially transfer shoe parts. For example, a protocol may determine that parts 211-214 are transferred and attached in a pre-determined order. Alternatively, a protocol may determine that parts 211-214 may be transferred and attached in any order. In another aspect, a protocol may determine that an order in which parts 211-214 may be transferred is dictated by a position of each part among stations 218 and 220. For example, a protocol may instruct apparatus 216 to transfer parts in an order that enables a most efficient movement path (e.g., least distance and least rotation) from stations 218 or 220 to station 222.

Figure 5:
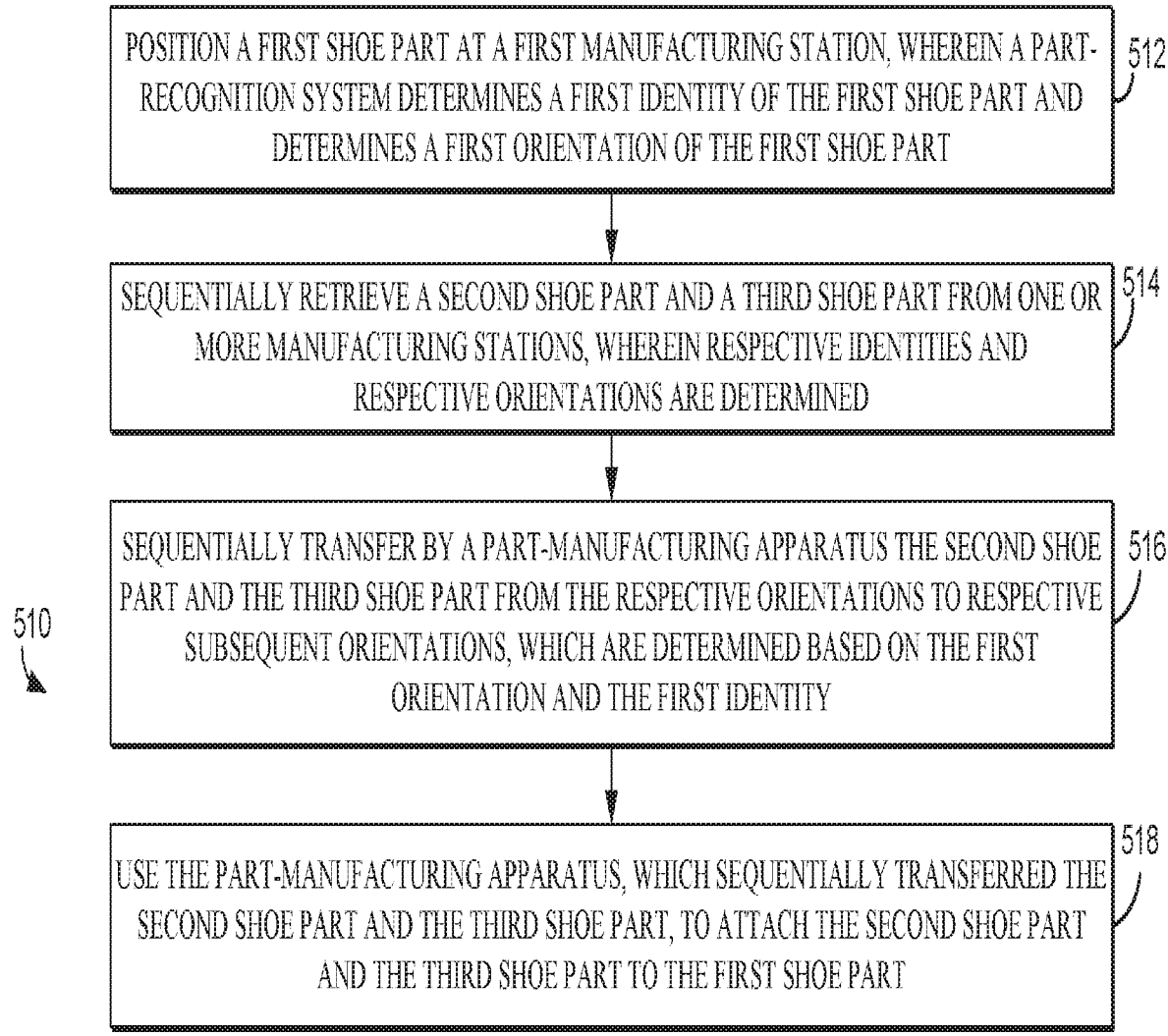

Referring now to FIG. 5, a flow diagram depicts a method 510 of manufacturing a shoe part in an automated manner that may be carried out in system 210. In describing FIG. 5, reference is also be made to FIG. 3. In addition, method 510, or at least a portion thereof, may be carried out when a computing device 236 executes a set of computer-executable instructions stored on computer storage media.

A block 512 depicts a step of positioning a first shoe part at a first manufacturing station, wherein a part-recognition system determines a first identity of the first shoe part and determines a first orientation of the first shoe part within a two-dimensional (2-D) geometric coordinate system. For example, shoe parts 215a and 215b may comprise a first shoe part positioned at manufacturing station 222. That is, a shoe part may also be comprised of an assembly of shoe parts. Accordingly, image recorder 234a and/or 234b may record an image of the assembly of parts 215a and 215b that is analyzed to determine an identity of the assembly and an orientation of the assembly relative to 2-D geometric coordinate system 232. As such, part-recognition system may treat the assembly of parts 215a and 215b as a single part for identification purposes and when determining an orientation.

Block 514 depicts a step of sequentially retrieving a second shoe part and a third shoe part from one or more manufacturing stations, wherein the part-recognition system determines respective identities of the second shoe part and the third shoe part and determines respective orientations, which are within the 2-D geometric coordinate system, of the second shoe part and the third shoe part. For example, shoe part 212 may be retrieved by apparatus 216, wherein an image of shoe part 212 captured by camera 234c or 234d before the retrieval or by camera 234e or 234f after the retrieval. The image of shoe part 212 may be analyzed by part-recognition system to determine a respective identity and respective orientation of shoe part 212. Subsequently, shoe part 211 may be retrieved, and an image of part 211 may be analyzed to determine a respective identity and respective orientation of shoe part 211.

A block 516 depicts using a part-manufacturing apparatus to sequentially transfer the second shoe part and the third shoe part from the respective orientations to respective subsequent orientations, both of which are determined based on the first orientation and the first identity. Continuing with the above example, if part 212 is retrieved first, apparatus 216, and more specifically tool 226a-d, may be used to transfer part 212 from the respective orientation of part 212 when the image was recorded to a subsequent orientation, which is illustrated by a broken-line view 246 of part 212. The subsequent orientation depicted by 246 may be determined based on an orientation of the assembly of parts 215a and 215b. Moreover, if part 211 is retrieved second, apparatus 216 may then transfer part 211 from the respective orientation of part 211 to a subsequent orientation, which is illustrated by a broken-line view 248 of part 212. The subsequent orientation depicted by 248 may be determined based on an orientation of the assembly of parts 215a and 215b.

A block 518 depicts using the part-manufacturing apparatus, which sequentially transferred the second shoe part and the third shoe part, to attach the second shoe part and the third shoe part to the first shoe part. For example, part-attachment tool 230 of apparatus 216, which may also transfer parts 211 and 212 using tools 224 and 226a-d, may attach parts 212 and 211 at orientations 246 and 248 (respectively) to the assembly of parts 215a and 215b. That is, pickup tool 224 may release part 212 (such as by removing a suction force), which is attached using part-attachment tool 230 to part 215a at orientation 246. Then, part 211 may be retrieved, transferred, and released by pickup tool 224 at orientation 248, at which point part 211 is attached by part-attachment tool 230.

Although method 510 is described as a series of sequential steps, the second shoe part and the third shoe part may be retrieved simultaneously from one or more manufacturing stations. In this aspect, the part-recognition system determines respective identities and orientations of the second shoe part and third shoe part. The part-manufacturing apparatus may then simultaneously transfer the second shoe part and the third shoe part from the respective orientations to respective subsequent orientations, both of which are determined based on the first orientation and the first identity. The second shoe part and the third shoe part may then be either sequentially or simultaneously attached to the first shoe part.

Accordingly, systems 110 and 210 have been described that may comprise at least a portion of system 10. The components of systems 110 and 210 are interchangeable and combinable in various manners to enable manufacturing of shoes and shoe parts having a wide range of characteristics. For example, shoe-manufacturing apparatus 16c may comprise various combinations of parts described with respect to apparatus 16a and 16b. Alternatively, shoe-manufacturing apparatus 16c may be comprised of different tools.

In an exemplary aspect, a part-pickup tool 24c (or a part pickup tool in "N Stations" 5) may be comprised of a medium pickup tool that is designed to pickup medium-sized shoe parts. A medium pickup tool may be configured in various manners to achieve desired functionality. In an exemplary aspect, a medium pickup tool is comprised of a plate that is similar to the plate described with respect to pickup tool 24a. However, if pickup tool 24a is designed to pick up larger shoe parts than pickup tool 24c, the plate of pickup tool 24c may be smaller than the plate of pickup tool 24a.

In another exemplary aspect a part-pickup tool 24c (or a part-pickup tool in "N Stations" 5) may be comprised of a combination of pickup tools, such that the pickup tool may be able to pick up shoe parts that range in size. For example, a part-pickup tool may be comprised of a combination of both a single- or dual-aperture pickup tool (as described with respect to pickup tool 24b) and a pickup tool having a plate with multiple apertures. As such, a combination pickup tool (i.e., hybrid pickup tool) may be able to pick up both small shoe parts and medium/large shoe parts. A hybrid pickup tool may be able to pickup a multitude of different parts through zonal activation/deactivation of the pickup force, through a hybrid approach to pickup force (e.g., vacuum and adhesion), and the like.

Figure 9:
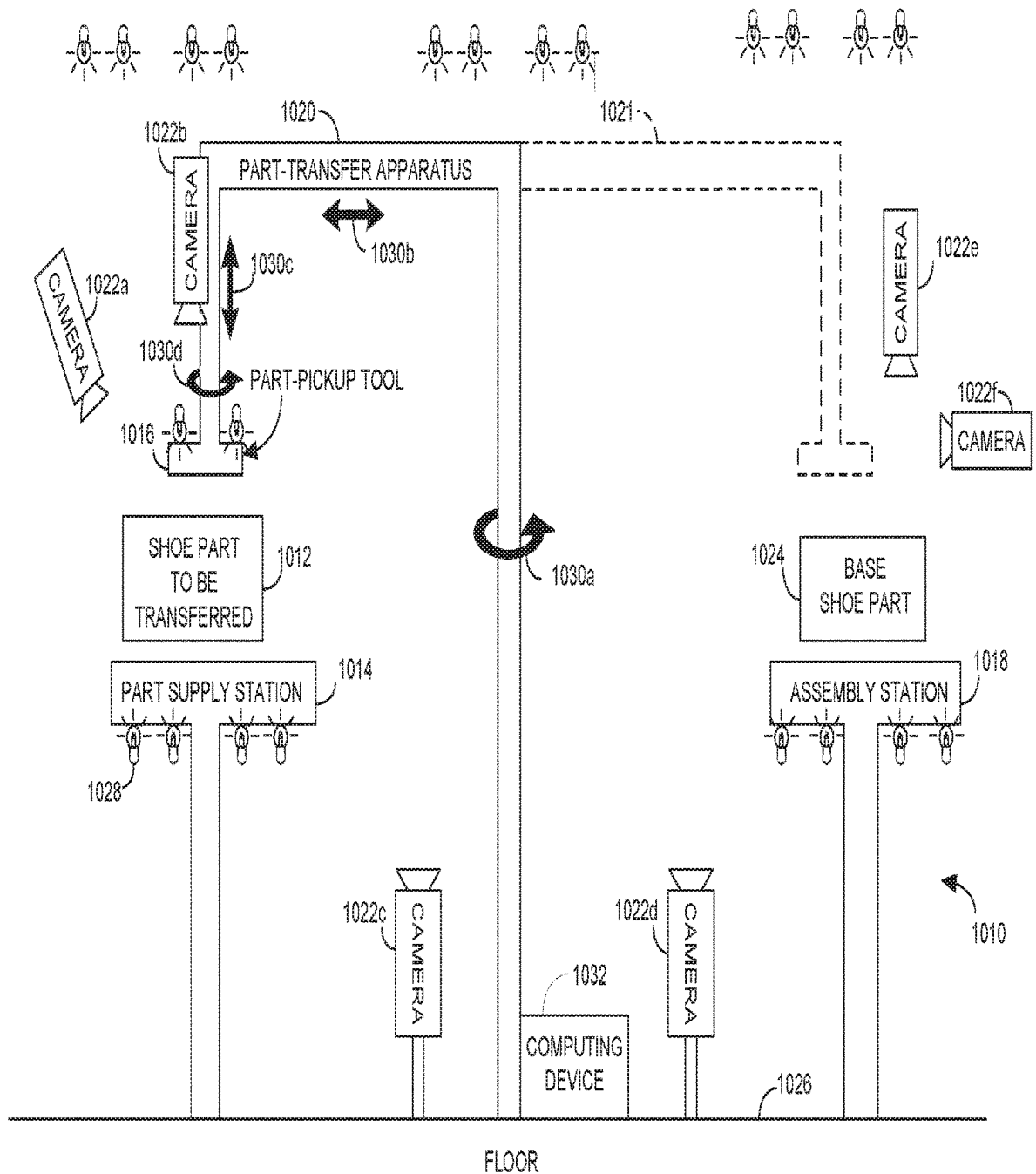
FIG. 9 depicts a schematic diagram of an exemplary system for shoe part identification in accordance with the present invention.

Subject matter described herein relates to an automated placement of a shoe part, and FIG. 9 depicts an exemplary system 1010 that may perform various actions in a shoe-manufacturing process. For example, a shoe part 1012 may be provided at a supply station 1014 together with several other shoe parts. Supply station 1014 may provide only a single type of part or multiple types of parts that are identified individually by system 1010. Supply station 1014 may comprise a conveyor belt, a table, a robotic arm, or any other device that can make shoe part 1012 available for identification and/or manipulation in accordance with the present invention. An automated tool 1016 (e.g., a pickup tool) may pick up the shoe part 1012 from the supply station 1014, and the shoe part 1012 may be transferred to an assembly station 1018 by a part-transfer apparatus 1020.

A ghost depiction 1021 of part-transfer apparatus is depicted to illustrate that the part-transfer apparatus may move to various positions. Moreover, various arrows 1030a-d are depicted that show possible movement directions or rotations of respective components of part-transfer apparatus 1020. Part transfer apparatus 1020 and the movement directions and rotations depicted by FIG. 9 are exemplary only. For example, arrows 1030a and 1030d indicate that respective arms of part-transfer apparatus 1020 may rotate, whereas arrows 1030b and 1030c indicate that respective arms may move vertically or horizontally (e.g., in a telescoping manner). Although not depicted, arms of part-transfer apparatus may also be comprised of articulating joints that enable additional ranges of motion of part-transfer apparatus 1020. The shoe part 1012 that is transferred may function as a base shoe part 1024 at the assembly station 1018. Alternatively, the shoe part 1012 that is transferred may be attached to a base shoe part 1024 that is already positioned at the assembly station 18.

When identifying and/or placing shoe part 1012 by part-transfer apparatus 1020, one or more cameras 1022*a-f* may record images of the shoe part 1012 that may be used to recognize the shoe part 1012. The cameras 1022*a-f* may be arranged at various positions in system 1010, such as above a part supply station (e.g., 1022*a*), on part-transfer apparatus 1020 (e.g., 1022*b*), along a floor 1026 (e.g., 1022*c* and 1022*d*), and/or above assembly station 1018 (e.g., 1022*e* and 1022*f*). In addition, the cameras 1022*a-f* may be arranged at various perspectives, such as vertical (e.g., 1022*b*, 1022*c*, 1022*d*, and 1022*e*), horizontal (e.g., 1022*f*), and angled (e.g., 1022*a*). The number, location, and/or orientation of cameras 1022*a-f* may vary beyond the example illustrated in FIG. 9.

The images may be used to determine a position and/or orientation of the shoe part 1012 relative to part-transfer apparatus 1020 and a position to which shoe part 1012 is to be transferred. Once the shoe part 1012 has been recognized, other shoe-manufacturing processes may be carried out in a manual and/or an automated fashion, such as transferring the shoe part, attaching the shoe part via any attachment method, cutting the shoe part, molding the shoe part, etc.

In a further aspect, information (e.g., shoe-part identity and orientation) obtained by analyzing images of the shoe part 1012 may be combined with information derived from other shoe-part analysis systems in order to carry out shoe-manufacturing processes. For example, a three-dimensional (3-D) scanning system may derive information (e.g., shoe-part surface-topography information, shoe-part-size information, etc.) from scans of the shoe part (or from scans of another shoe part that is assembled with the shoe part), and the 3-D-system-derived information may be combined with the shoe-part-identity and/or shoe-part orientation information. That is, the 3-D-system-derived information may be determined upstream and communicated downstream to system 1010 (or vice versa).

Information that is combined from different systems may be used in various manners. In an exemplary aspect, if system 10 is used to attach shoe part 1012 onto shoe part 1024, information obtained from another system may be used to instruct and carry out an attachment method. For example, an amount of pressure may be calculated (based on information provided by another system) that is recommended to be exerted against the shoe part 1012 in order to sufficiently attach the shoe part to one or more other shoe parts 1024. Such pressure measurements may be dependent on various factors determined and/or communicated from another system, such as a size (e.g., thickness) of the shoe part and/or a number of shoe parts (e.g., layers) that are being attached.

Computing device 1032 may help execute various operations, such as by analyzing images and providing instructions to shoe-manufacturing equipment. Computing device 1032 may be a single device or multiple devices, and may be physically integral with the rest of system 1010 or may be physically distinct from other components of system 1010. Computing device 1032 may interact with one or more components of system 1010 using any media and/or protocol. Computing device 1032 may be located proximate or distant from other components of system 1010.

Light-emitting devices 1028 may be positioned throughout system 10 and may be used to enhance a contrast of shoe part 1012 that may be useful when an image of shoe part 1012 is used to recognize shoe part 1012. Light-emitting devices may be incandescent bulbs, fluorescent devices, LEDs, or any other device capable or emitting light. A light-emitting device may be positioned in various locations, such as near and/or integrated into supply station 14 or part-pickup tool 16. Additionally, a light-emitting device may be positioned near or integrated into assembly station 18. Moreover, light-emitting devices may be positioned throughout the space that surrounds part-transfer apparatus 1020, part-pickup tool 1016, part supply station 1014, assembly station 18, and cameras 1022*a-f*. Varying numbers, types, and positions of light emitting devices may be used in accordance with the present invention. Light emitting devices may be selected based upon the spectrum of light emitted and how that spectrum interacts with spectrums reflected by shoe part 1012, supply station 1014, assembly station 1018, part-pickup tool 1016, etc. For example, light-emitting devices may provide full-spectrum light and/or partial-spectrum light (e.g., colored light).

Various aspects of FIG. 9 have been described that may also be applicable to other systems described in this disclosure, such as systems depicted in FIGS. 11, 13, 14, and 15. Accordingly, when describing these other systems, reference may also be made to FIG. 9 and aspects described in FIG. 9 may also apply in these other systems.

As indicated with respect to FIG. 9, some aspects of the invention are directed to using an image of a shoe part to identify certain shoe-part information, such as an identity of the shoe part and an orientation of the shoe part (e.g., position and rotation). The shoe-part identity and shoe-part orientation may then be used to carry out various shoe-manufacturing steps (e.g., placement, attachment, molding, quality control, etc.). Accordingly, certain processes may be executed before the image is recorded in order to facilitate shoe-part-image analysis, and reference is made to FIG. 10 to describe such aspects.

Figure 10:
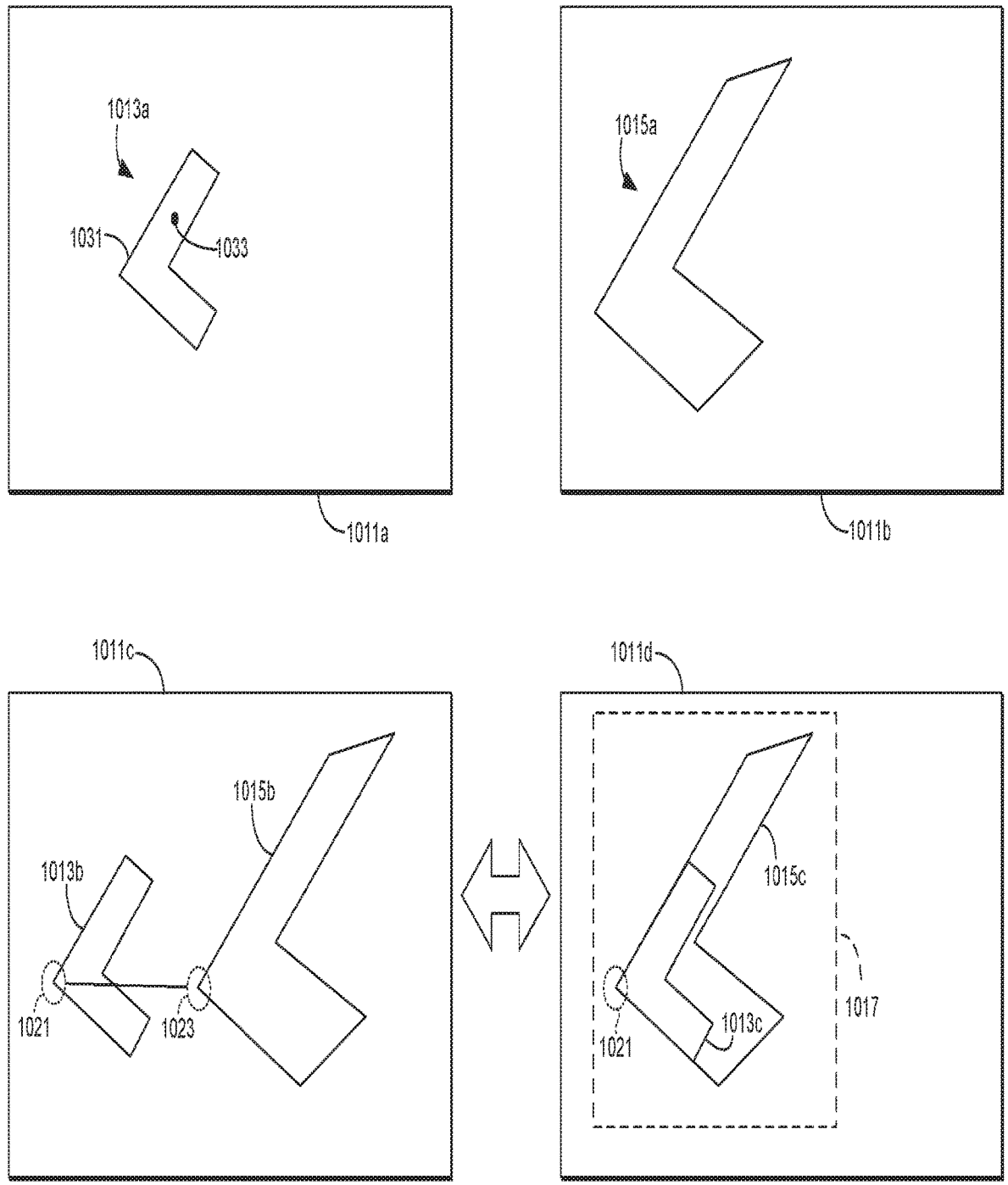
FIG. 10 illustrates exemplary shoe-part references that may be generated and analyzed in accordance with the present invention.

FIG. 10 illustrates various depictions 1011*a-d*, each of which provides one or more exemplary shoe-part reference patterns or models (hereinafter known as shoe-part references). For example, depiction 1010*a* provides an exemplary shoe-part reference 1013*a*, and depiction 1010*b* provides a different shoe-part reference 1014*a*. Depictions 1010*a-d* may represent data that is maintained in a computer-storage medium and is retrievable to execute computing functions. For example, depictions 1010*a-d* may be stored in a computer-storage media as reference models or patterns and retrieved in order to be viewed on a computing output device (e.g., computer display monitor).

Shoe-part references 1012*a* and 1014*a* may be determined and/or created using various techniques, such as by using a computer-assisted drawing program, an automatic shape-outlining computer program, or other boundary-determination computer program. For example, an electronic image of a shoe part may be recorded and analyzed by the automatic shape-outlining computer program, which automatically traces boundaries or perimeters of shapes that comprise the shoe part. In another aspect, shapes depicted in an electronic image of a shoe part may be manually traced using a computer-drawing application. In another example, a shoe part and/or a boundary associated therewith may be manually drawn using a computer-drawing application. FIG. 10 depicts that shoe-part references may be comprised of a shoe-part perimeter or boundary (e.g., 1030), as well as an interior portion (e.g., 1032) bound by the perimeter 1030. As previously indicated, once created, a shoe-part reference may be electronically stored (e.g., item 234 in FIG. 11) and used in various manners, such as to analyze shoe-part images.

In one aspect, a shoe-part reference (e.g., shoe-part reference 1012*a*) is created such that it may be scaled to correspond to a multiple of different shoe sizes. For example, a shoe-part reference corresponding to a model size (i.e., a model size for females and a model size for males) is created and all other matching shoe-part references are scaled off of the shoe-part reference corresponding to the model size. A shoe-part reference may be scaled up to, for example, five times to account for the different sizes. Further, the shoe-part reference can be scaled to allow for expansion and/or shrinkage for any particular size.

Continuing, references 1013*a* and 1015*a* may be used to determine reference information, which may be subsequently used to assemble shoe parts. For example, an attachment shoe part (e.g., 1224 in FIG. 11) may be positioned relative to a base shoe part (e.g., 1226 in FIG. 11); however, before the attachment shoe part is positioned, it may be helpful to determine a placement location at which the attachment shoe part should be positioned.

As such, in an illustrative aspect, depiction 1011*c* comprises a reference 1015*b*, which represents a physical boundary of a base shoe part, and a reference 1012*b*, which represents a physical boundary of an attachment shoe part. In an exemplary aspect, reference 1013*b* may be positioned to overlay reference 1015*b* and may be aligned with at least a portion of the reference 1015*b*. For example, boundary 1013*b* may be manually and/or automatically positioned (e.g., drag via input device) in a manner that is consistent with how an attachment shoe part would be arranged onto a base shoe part when the attachment shoe part will be attached to the shoe part. As such, depiction 1012*d* illustrates a digitally rendered assembly of references 1017, which is comprised of reference 1013*c* aligned with reference 1015*c* in a position consistent with an attachment position.

In a further aspect of the invention, a reference feature 10210 may be identified that aligns a portion of reference 1013*c* with a portion of reference 1015*c*. As such, each of references 1013*c* and 1015*c* comprises respective reference features that are generally aligned with one another. These respective reference features are shown in depiction 1011*c* and are identified by reference numerals 1021 and 1023. For example, a respective reference feature may be used to determine an orientation (e.g., position and rotation) of a shoe part, as well as a portion of the shoe part that aligns with another shoe part.

Figure 11:
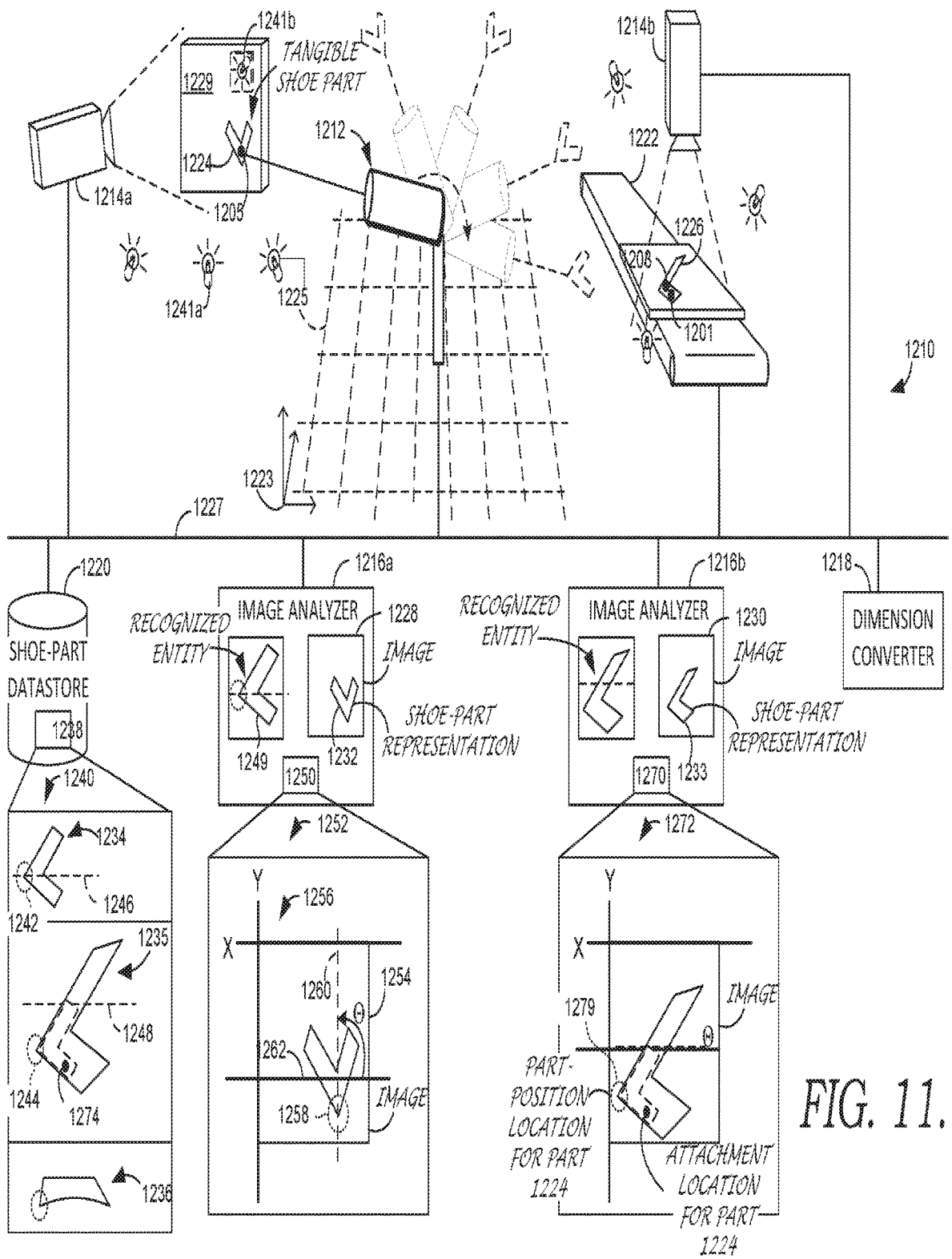
FIG. 11 depicts a schematic diagram of an exemplary system for shoe-part identification in accordance with the present invention.
Figure 12:
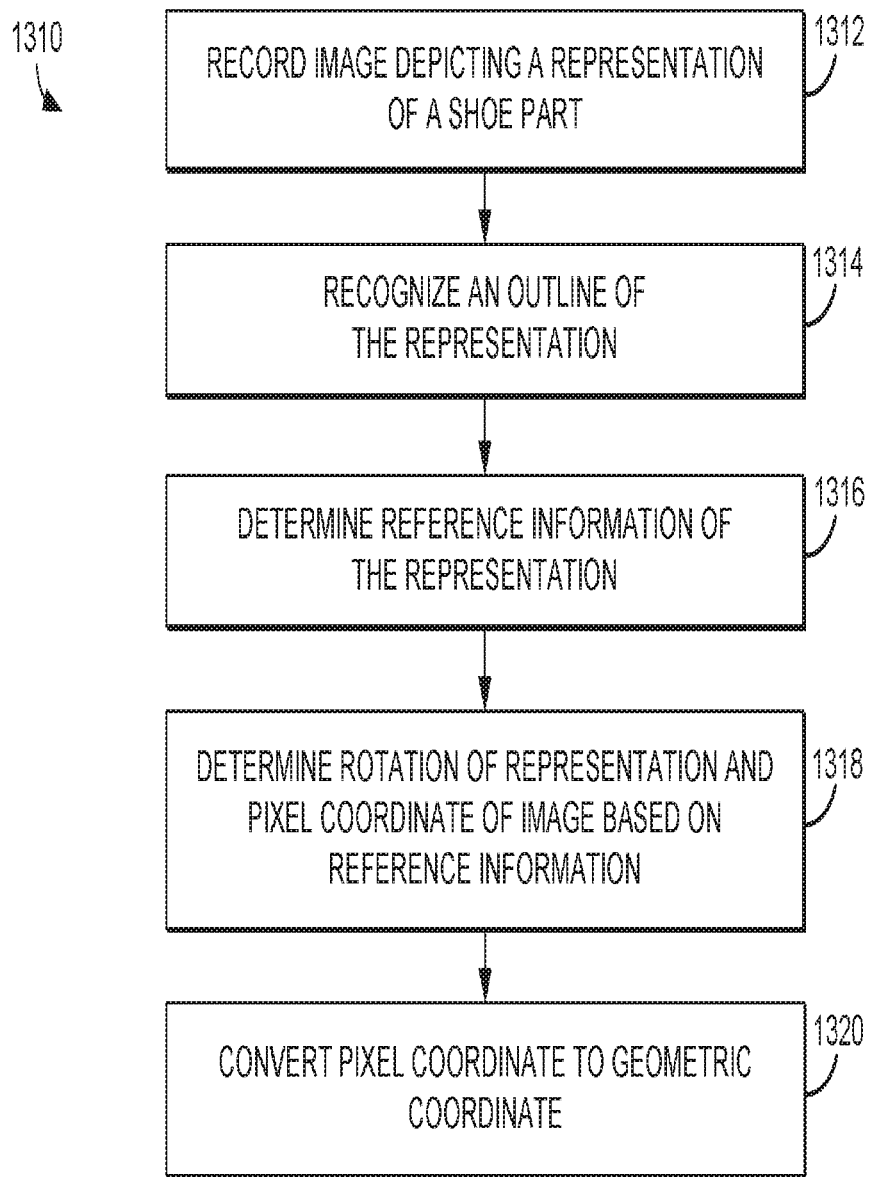
FIG. 12 depicts a flow diagram of a method for analyzing an image of a shoe part.

Now described is FIG. 11, in which an exemplary shoe-manufacturing system 1210 is depicted. System 1210 may have a combination of shoe-manufacturing equipment and computing devices, which may assist in determining automated operations of the equipment. Operations carried out in system 1210 may facilitate manipulation of shoe part 1224 and shoe part 1226, such as by transferring shoe part 1224 and attaching shoe part 1224 onto shoe part 1226. For example, shoe parts 1224 and 1226 may comprise two different pieces of flexible material, which are attached to one another to form part of a shoe upper. Shoe parts 1224 and 1226 may comprise the same or different types of flexible material, such as textiles, leathers, TPU materials, etc. Shoe parts 1224 and 1226 may be physical structures of the completed shoe and/or a component, such as an adhesive film, that may be used to join shoe components during the shoe manufacturing process.

A part-transfer apparatus 1212, cameras 1214*a* and 1214*b*, and conveyor 1222 are examples of shoe-manufacturing equipment. A grid 225 is depicted in FIG. 11 (in broken lines) to convey that one or more items of the shoe-manufacturing equipment have a known position within a coordinate system (e.g., geometric coordinate system mapping a 3-D space within which the equipment is positioned). Other items, such as shoe parts, may be moved to known distances within the coordinate system. Although for illustrative purposes grid 225 only depicts two coordinates, axis arrows 223 depict three axes.

Image analyzers 1216*a* and 1216*b* and dimension converter 1218 represent operations and/or modules that may be carried out by a computing device. Moreover, FIG. 11 depicts that the shoe-manufacturing equipment may communicate with (i.e., be networked with) computing devices that execute the depicted operations by way of a network connection 227. For example, as will be described in more detail below, image analyzers 1216*a* and 1216*b* may evaluate images recorded by cameras 1214*a* and 1214*b* to recognize shoe parts being utilized in the shoe manufacturing process. In addition, image analyzers 1216*a-b* and dimension converter 1218 communicate instructions to part-transfers apparatus 1212. One example of this type of vision recognition system includes Cognex® machine vision systems.

Components depicted in system 1210 cooperate in different ways to assist in carrying out various steps of a shoe-manufacturing method. For example, some components of system 1210 may operate collectively as part of a two-dimensional ("2-D") part-recognition system, which is used to determine various shoe-part characteristics, such as shoe-part identity and shoe-part orientation (e.g., placement and rotation) relative to part-transfer apparatus 1212. For example, a part-recognition system may comprise cameras 1214*a-b*, image analyzers 1216*a-b*, shoe-part datastore 1220, dimension converter 1218, and some or all of part-transfer apparatus 1212.

A part-recognition system may be used in various manners within a shoe manufacturing process. For example, a part-recognition system may be used to execute a method 1310 that is outlined in FIG. 12. Method 1310 relates to identifying a shoe part and determining an orientation (e.g., geometric position and degree of rotation) of the shoe part. When an identity and orientation of a shoe part is known or determined, the shoe part can be manipulated (e.g., transferred, attached, cut, molded, etc.) in an automated manner. In describing FIG. 12, reference will also be made to FIG. 11 and FIG. 13.

At step 1312, an image is recorded that depicts a representation of a shoe part. For example, an image may be recorded by camera 1214*a* or 1214*b* and communicated to an image analyzer 1216*a* or 1216*b*. Exemplary images 1228 and 230 are illustrated in image analyzers 1216*a* and 1216*b* (respectively), and each image depicts a two-dimensional ("2-D") representation 1232 and 1233 of a respective shoe part.

In step 314, an outline or perimeter of the representation as depicted in the image is recognized. For example, once image analyzer 1216*a* acquires image 1228, image analyzer 1216*a* recognizes a perimeter or outline of the 2-D representation 1232 depicted in image 1228. Perimeter or outline recognition may be enhanced using various techniques, such as by providing a background surface that highly contrasts a part depicted in the image, as well as by positioning various environment lighting elements (e.g., full-spectrum light-emitting devices). For example, if a surface of the shoe part that will be captured in the image is grey, a background surface (e.g., surface of a supply station, a part-pickup tool, or an assembly station) may be colored yellow in order to create a contrast in the image between the outline of the part and the background. In one aspect, shoe-part inward-facing surfaces (i.e., a side of the shoe part that may face inward and towards a wearer's foot when assembled into a shoe) and background surface may be manufactured (i.e., intentionally made) to comprise known contrasting colors.

Additional tools may be used to assist with recognizing a perimeter or outline of a representation. For example, system 1210 may comprise light-emitting devices 1241a and 1241b that illuminate the shoe part from various sources. As described with respect to FIG. 9, light-emitting devices may be arranged in various positions throughout system 1210. For example, surface 1229 may be illuminated with device 1241a or backlit with light 1241b, thereby enhancing a contrast between surface 1229 and part 1224 to render part 1224 more recognizable to the 2-D recognition system. That is, if part 1224 is illuminated or backlit when image 1228 is captured, a better contrast may appear in image 1228 between representation 1232 and other portions of the image. A full-spectrum light may be used for enhancing part recognition of parts having various colors. Alternatively, a color of the light may be customized based on a color of part 1224 and/or the color of supply station and/or assembly station. For example, a red light may be used to enhance a contrast between parts and a supply assembly station that are black or white.

Next, at step 1316, image analyzer 1216a may determine a plurality of reference features associated with the 2-D representation 1232 depicted in image 1228. For instance, the reference features may comprise a number of spaced lines and/or points that define the outline or perimeter of the 2-D representation. The spacing between adjacent reference features may be variable. For instance, the spacing between reference features for smaller-sized shoe parts may be less than the spacing between reference features for larger-sized shoe parts to allow for more precision. Each reference feature may be comprised of a variable number of pixels.

An identity of a boundary of the 2-D representation 1232 may be recognized using various techniques. For example, shoe-part representation 1232 may be compared to various known or model shoe-part references 1234-1236, which are stored in shoe-part datastore 1220 in order to determine the identity of the shoe-part representation 1232.

Shoe-part datastore 1220 stores information 1238, which is shown in an exploded view 240 for illustrative purposes. As an example, exploded view 1240 depicts a plurality of known shoe-part references 1234-1236 that may be used to recognize the identity of the 2-D representation 1232. Shoe-part references 1234-1236 may be associated with pre-determined reference features (e.g., 1242 and 1244) as outlined above with respect to FIG. 10, which may be used when assembling a respective shoe part into a shoe. Such reference features may be pre-determined based on various factors, such as a known position of a shoe part among an assembly of shoe parts. For example, when incorporated into a shoe, shoe part 1224 is assembled at a position with respect to shoe part 1226. As such, this position may be measured and used to instruct shoe-manufacturing equipment on positioning and attachment of shoe part 1224.

As depicted in FIG. 11, shoe-part references 1234-1236 form various 2-D shapes. In an aspect of the invention, the pre-determined reference features may comprise any number of features associated with the perimeter or outline of the shoe-part references 1234-1236. For example, a reference feature may comprise a specified proportion between different sides of the 2-D shape. As well, a reference feature may comprise a junction point between two adjacent sides of the 2-D shape. Creating pre-determined reference features along a perimeter of the shape can reduce variability that may be created when shoe parts are aligned and connected.

The image analyzer 1216a may recognize an identity of the 2-D representation 1232 by identifying at least one shoe-part reference of the plurality of shoe-part references 1234-1236 that substantially matches the 2-D shoe-part representation 1232. For example, the image analyzer 1216a may recognize the identity of the 2-D shoe-part representation 1232 by identifying at least one pre-determined reference feature of a shoe-part reference that substantially matches the at least one reference feature of the 2-D representation 1232.

Once a shoe-part representation (e.g., 1232) is substantially matched to a known shoe-part reference (e.g., 1234), the pre-determined reference feature(s) may be used to analyze an image that depicts the representation. For example, image analyzer 1216a has retrieved a recognized entity 1249 based on shoe-part reference 1234, which was substantially matched to 2-D representation 1232. As depicted, recognized entity 1249 has a boundary and pre-determined reference feature(s). Accordingly, when the descriptions of FIGS. 10 and 11 are collectively considered, an exemplary method may comprise various steps. For example, model references (e.g., 1012a and 1014a) and their corresponding pre-determined reference features (e.g., 1021 and 1022) are determined and electronically maintained, such as in datastore 1220. A recorded image (e.g., 1228 and 1230) may then be substantially matched to a model reference by substantially matching reference features of the recorded image with pre-determined reference features of the model. This reference information may be mathematically depicted with respect to a known reference system.

At step 1318, a rotation of the representation (as depicted in the image) and pixel coordinates of the image are identified. To illustrate one manner in which image analyzer 1216a utilizes recognized entity 1249 to execute step 1318, information 1250 is depicted in an exploded view 1252. Exploded view 1252 depicts image 1254 that is identical to image 1228. For example, image 1254 and image 1228 may be the same data, or image 1254 may be a copy of image 1228. Image 1254 is depicted respective to a coordinate system 1256, which maps pixels of image 1254. Recognized entity 1249 is applied to image 1254, such as by substantially centering image 1254 within the boundaries of recognized entity 1249 and aligning by reference feature(s) 1258. As such, pixel coordinates of image 1254 can be determined that belong to coordinate system 1252. In addition, a degree of rotation (i.e., 0) of the shoe-part representation (as depicted in image 1254) is determined by measuring an angle between reference lines 1260 and 1262.

The pixel coordinates and degree of rotation that are extracted from the image may be used to instruct part-transfer apparatus 1212. That is, image 1228 may be recorded by camera 1214a when shoe part 1224 is oriented (i.e., positioned and rotated) somewhere in the 3-D space in which part-transfer apparatus 1212 operates. Examples of positions at which shoe part 1224 may be located include a part supply station, an assembly station, and/or held by part-transfer apparatus 1212. Accordingly, when certain inputs are provided, pixel coordinates of image 1228 may be converted by dimension converter 1218 to a geometric coordinate 205 of the system represented by grid 225.

Accordingly, in step 1320 of method 1310 the pixel coordinates may be converted to a geometric coordinate.

Figure 13:
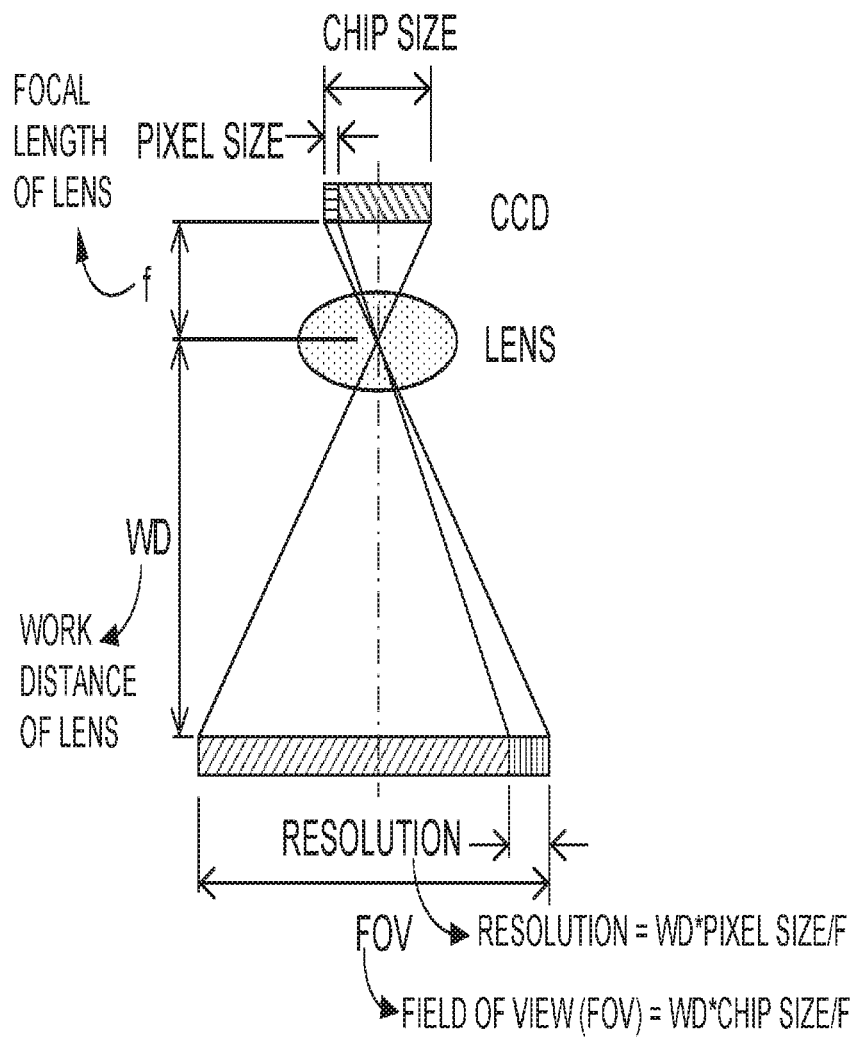
FIG. 13 depicts a schematic diagram of an exemplary image-recording system.

Inputs utilized by dimension converter 1218 may comprise measurement values describing system 1210, camera 1214*a*, and part-transfer apparatus 1212. Examples of such measurement values are relative positions (i.e., zero positions) of camera 1214*a* and of part-transfer apparatus 1212; a number of pixels of the X and Y coordinates of system 1256; a distance between camera 1214*a* and part 1224; a chip size of the CCD in camera 1214*a*; a lens focal length; a field of view; a pixel size; and a resolution per pixel. These inputs may vary depending on the capabilities of the equipment used in system 1210 and some inputs may have a direct bearing on where equipment may be positioned within system 1210. For example, the strength of camera 1214*a* may have a bearing on where part 1224 should be positioned (relative to camera 1214*a*) when camera 1214*a* will record an image of part 1224. To further illustrate a relationship between various inputs used to convert a pixel coordinate to a geometric coordinate, FIG. 13 depicts a schematic diagram of a system with which an image may be recorded and analyzed.

The geometric coordinate generated by dimension converter 1218 can be used to report a position of shoe part 1224 to part-transfer apparatus 1212. Moreover, the degree of rotation can be used to determine to what extent shoe part 1224 may need to be rotated by part-transfer apparatus 1212 in order to be properly aligned for subsequent manipulation (e.g., attachment to another shoe part, cutting, painting, etc.). Accordingly, part-transfer apparatus 1212 may comprise a part-pickup tool that enables part-transfer apparatus 1212 to acquire part 1224 from a part-supply area and hold part 1224 while transferring part 1224 to a new location. For example, part-transfer apparatus 1224 may use a gripping structure, suction, electromagnetic forces, surface tack, or any other methodology to temporarily engage and move a shoe part.

Although the above 2-D recognition process is described by referencing shoe part 1224 and image 1228, a similar analysis may be used to identify shoe part 1226 and determine its orientation, thereby enabling part-transfer apparatus 1212 to account for part 1226 when manipulating part 1224. That is, information 1270 is depicted in image analyzer 1216*b* and is shown in an exploded view 1272 for illustrative purposes. Exploded view 1272 conveys that image 1230 may be analyzed similar to image 1228 to determine an orientation (i.e., geometric coordinate and degree of rotation) of part 1226 based on reference feature(s) 1279 and theta. Any number of shoe parts may be identified and/or positioned, either simultaneously or sequentially in accordance with the present invention.

Once respective geometric coordinates of part 1224 and part 1226 are known, part-transfer apparatus 1212 can pick up part 1224 and move part 1224 to a part-position coordinate 203 that is relative to the geometric coordinate of part 1226. For example, FIG. 11 depicts multiple broken-line views of part-transfer apparatus 1212 to illustrate a movement of part-transfer apparatus and a transfer of part 1224. A part-position coordinate 1203 refers to a coordinate in the geometric coordinate system (e.g., the system illustrated by grid 1225) to which an attachment part (e.g., part 1224) is transferred in order to be attached to a base part (e.g., part 1226). For example, part-transfer apparatus 1212 may transfer part 1224 to geometric coordinate 1203 to be attached to part 1226.

A part-position coordinate 1203 may be determined in various ways. For example, part 1226 may be a base shoe part onto which part 1224 is attached, such that a position of part 1224 respective to part 1226 (when the parts are assembled) is known. As such, the known position may be determined by retrieving a stored reference feature, which was pre-determined using a method similar to that described with respect to FIG. 10. However, this position that is known may still be converted to a coordinate that is recognized by part-transfer apparatus 1212 when part 1226 has been positioned within a coordinate system of part-transfer apparatus 1212. That is, outside of coordinate system 1225, a position relative to part 1226 at which part 1224 is arranged is known, and is identified by reference numeral 1277 in datastore 1220. This position is also identified in exploded view 1272 in which the position is identified as "part-position location for part 1224." When an orientation of part 1226 is determined, such as by executing method 1310, the point 1277 (also depicted in exploded view 1272) that is respective to part 1226 at which part 1224 is arranged can be converted to a geometric coordinate 1203 within system 1225, thereby calculating part-position coordinate 1203. Accordingly, in an exemplary aspect, part-position 1203 is converted to a geometric coordinate based in part on reference feature 1022, which was described with reference to FIG. 10.

In a further aspect, once part-position point 1203 is determined, part 1224 can be transferred to the part-position coordinate 1203 based on the reference information determined with respect to part 1224 (e.g., 1021 in FIG. 10). For example, pixel coordinates and orientation may be derived from image 1228 (as described above) and may be converted to a geometric coordinate (e.g., 1205). Calculations may then be made to transfer part 1224 to point 1203. For example, a virtual robot end effector may be created based on the geometric data (e.g., 1203 and 1205) and may be moved from point 1205 to point 1203. While these steps are depicted graphically in FIG. 11 for illustrative purposes, these steps could also be executed mathematically by solving sequential conversion algorithms.

Accordingly, the above-described recognition process (e.g., method 1310) may be used in many different scenarios within a shoe-manufacturing process. For example, once shoe part 1224 has been positioned respective to shoe part 1226, shoe part 1224 can be attached to shoe part 1226, such as by stitching, adhering, and/or sonic welding. As such, in order to enable automation, a geometric coordinate 1201 of the attachment point is also determined. That is, once geometric coordinates of parts 1224 and 1226 are known within coordinate system 1225, geometric coordinates of attachment locations can also be calculated.

An attachment-point coordinate 1201 may be determined in various ways. For example, part 1226 may be a base shoe part onto part 1224 is attached. As such, a point of attachment onto base shoe part is known, but it still may be converted to a coordinate that is recognized by part-transfer apparatus 1212. That is, outside of coordinate system 1225, a point on part 1226 at which part 1224 will be attached is known, and is identified by reference numeral 1274 in datastore 1220. When an orientation of part 1226 is determined, such as by executing method 1310, the point 1274 (also depicted in exploded view 1272) on part 1226 at which part 1224 is attached can be converted to a geometric coordinate 1201 within system 1225. As such, an attachment process can be executed at the geometric coordinate 1201. As indicated above, although these steps are depicted graphically in FIG. 11 for illustrative purposes, these steps could also be executed mathematically by solving sequential conversion algorithms.

In one aspect, part-transfer tool 1212 also may have an attachment device, which operates to attach part 1224 to part 1226. Exemplary attachment devices are an ultrasonic welder, heat press, stitching apparatus, or a device that accomplishes a respective method of attachment.

The components of system 1210 may be arranged in various configurations to accomplish a wide range of shoe-manufacturing processes. In addition, there may be additional components arranged into a series of stations. For example, system 1210 may be comprised of cameras in addition to cameras 1214*a-b*, as well as additional part-transfer apparatuses. Different types of cameras and/or part transfer apparatuses may be combined in accordance with the present invention. These additional tools may be arranged at different positions along conveyor 1222 to allow additional parts to be added (e.g., added to the assembly of parts 1224 and 1226) and to allow additional shoe-part manipulation.

Moreover, the cameras of system 1210 may be arranged at different positions with respect to a shoe part. For example, as depicted in FIG. 9, cameras may be positioned above a shoe part, below a shoe part, horizontal to a shoe part, or at an angle away from a shoe part, so long as the camera position allows the geometric coordinate of the part to be calculated. One such camera position may be perpendicular to (i.e., normal to) a viewing plane. However, the camera could be positioned at an angle from the viewing plane, so long as the angle is provided as an input to the system when converting the representation orientation to a geometric coordinate. Accordingly, system 1210 may be incorporated into larger shoe-manufacturing processes.

A 2-D recognition system may be used at an initial stage to enable part-transfer apparatus 1212 to position a base shoe part onto a conveyor or other part-moving apparatus. A base shoe part refers to a shoe part onto which one or more other shoe parts may be attached, and a base shoe part may be constructed of a single part or a plurality of parts that have been assembled. Accordingly, part 1226 may be deemed a base shoe part onto which part 1224 is attached. Parts transferred may also be foams, mesh, and/or adhesive layers, such as TPU films, ultimately used to join other parts together. Further, component parts previously affixed to one another in accordance with the present invention may be treated as a single part for subsequent identification transfer, etc.

Figure 14:
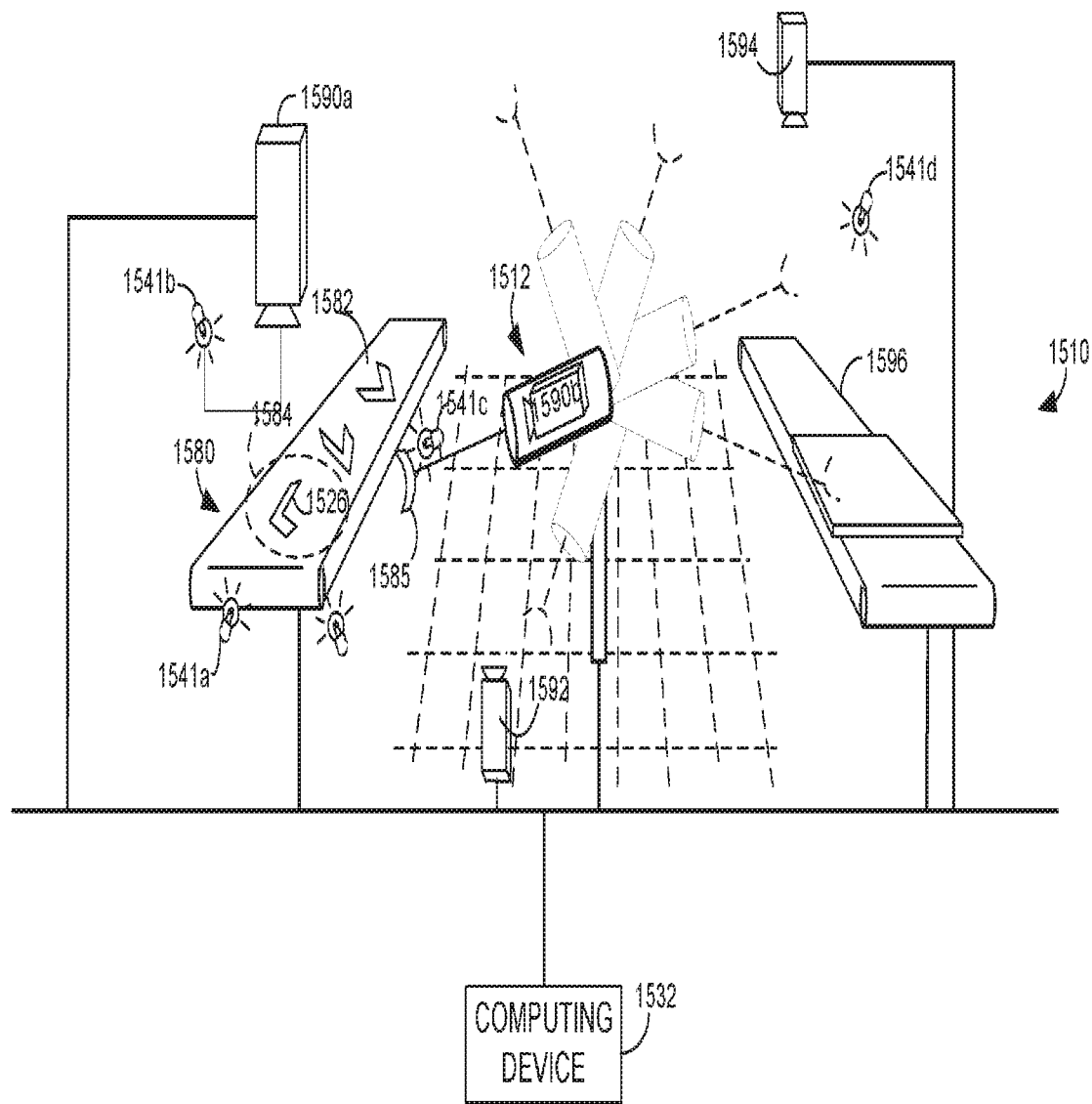
FIGS. 14 and 15 depict a respective schematic diagram of an exemplary system for carrying out shoe-manufacturing methods.

Referring to FIG. 14, a system 1510 is depicted in which a 2-D part-recognition system may be used at an initial manufacturing stage, such as when the base shoe part 1526 is initially stored at a part-supply station 1580, which may be comprised of various configurations. For example, a part-supply station 1580 may comprise a set of stacked base shoe parts from which part-transfer apparatus 1512 acquires a topmost base shoe part. Alternatively, the part-supply station may have a conveyor 1582 that transfers the base shoe part to a pickup location 1584 at which part-transfer apparatus 1512 acquires the base shoe part. As previously described, part-transfer apparatus 1512 may have a part-pickup tool 1585.

Prior to transferring base shoe part 1526 to conveyor 1596, a camera may record an image of the base shoe part 1526 to allow part-transfer apparatus 1512 to determine a geometric position and rotation of the base shoe part 1526. For example, a camera may record an image of the base shoe part 1526 when the base shoe part 1526 is next-in-line to be acquired by part-transfer apparatus 1512—i.e., immediately prior to the base shoe part 1526 being acquired by part-transfer apparatus 1512 and when the base shoe part 1526 is at pickup location 1584. The camera may be an above-mounted camera 1590*a-b* that is mounted above, and perpendicular to, the base shoe part 1526. As depicted in FIG. 14, an above-mounted camera 1590*a-b* may be mounted either apart from (e.g., 1590*a*) or onto (e.g., 1590*b*) part-transfer apparatus 1512.

Although part-transfer apparatus 1512 is illustrated to have a certain configuration depicted in FIG. 14, part-transfer apparatus may have a different configuration, such as the configuration depicted in FIG. 9, in which a camera mounted to the part-transfer apparatus may be positionable directly above and perpendicular to base shoe part 1526. Part-transfer apparatus 1512 may also comprise a plurality of articulating arms that enable movement of a camera (or an acquired shoe part) to a desired angle or position.

Moreover, if the image is recorded while the base shoe part 1526 is at a part-supply station (i.e., at location 1584), a light-emitting device may be arranged at various positions throughout system 1510. For example, a light-emitting device 1541*a* may be positioned adjacent to or incorporated into the part-supply station 1580 to provide a backlight to the base shoe part 526. Also, a light-emitting device 1541*b* may be positioned in a space that surrounds base shoe part, such that the light-emitting device 1541*b* illuminates base shoe part 1526 from a front side.

Alternatively, part-transfer apparatus 1512 may acquire base shoe part 1526 before an image is recorded and position the acquired base shoe part in front of a camera. For example, a below-mounted camera 1592 may be secured near a floor surface, and part-transfer apparatus 1512 may position the acquired base shoe part directly above, and perpendicular to, the below-mounted camera 1512. Alternatively, part-transfer apparatus 1512 may position the acquired base shoe part directly below, and perpendicular to, above-mounted cameras 1590*a* or 1594. As described above, although part-transfer apparatus 1512 is illustrated to have a certain configuration depicted in FIG. 14, part-transfer apparatus may have a different configuration. For example, part-transfer apparatus 1512 may have the configuration depicted in FIG. 9. In addition, part-transfer apparatus may be comprised of a plurality of articulating arms.

If the image is recorded after the base shoe part 1526 has been acquired by part-transfer apparatus, a light-emitting device 1541*c* may be arranged at various positions. For example, a light-emitting device 1541*c* may be incorporated into the part-transfer apparatus 1512, such as behind (or incorporated into) the part-pickup tool 1585, thereby providing a backlight to base shoe part 1526. In addition, other light-emitting devices (e.g., 1541*d*) positions throughout system 1510 may illuminate a front side of a base shoe part that is acquired by part-transfer apparatus 1512

Once an image has been recorded, a geometric position and rotation of the base shoe part may be determined using the previously described methods (e.g., method 1310). The geometric position and rotation may then be used to determine a position of the base shoe part when the base shoe part is transferred to conveyor 1596. For example, part-transfer apparatus 1512 may execute a predetermined movement path each time it transfers base shoe part 1526 from a part-supply station 580, or from in front of a camera (e.g., 1590*a*, 1592, or 1594), to conveyor 1596. As such, once the geometric position and rotation of the base shoe part are known, the part-transfer apparatus may determine where the base shoe part will be positioned when the predetermined movement path is executed. Alternatively, a geometric position on conveyor 596 may be predetermined, such that part-transfer apparatus 1512 (or some computing device associated therewith) calculates a new movement path each time. That is, the new movement path extends from the calculated position of the base shoe part 1526 (when the image is recorded) to the predetermined position on the conveyor 1596. Computing device 1532 may help execute various operations, such as by analyzing images and providing instructions to shoe-manufacturing equipment.

In another aspect, a 2-D recognition system may be used when base shoe part 1526 has already been transferred to conveyor 1596 in order to determine a geometric position and rotation of base shoe part 1526 as it is arranged on conveyor 1596. As such, conveyor 1596 may move base shoe part along an assembly line and to a position that is beneath an above-mounted camera (e.g., 1594). Once an image has been recorded by the above-mounted camera and a position of base shoe part has been determined, other shoe parts may be transferred and attached to the base shoe part.

As such, in a further aspect, a 2-D recognition system may be used after the initial stage to enable a part-transfer apparatus to position an attachment shoe part. An attachment shoe part refers to a shoe part that is to be attached to a base shoe part. Accordingly, in FIG. 11 part 1224 may be deemed an attachment shoe part that is to be attached to shoe part 1226.

Figure 15:
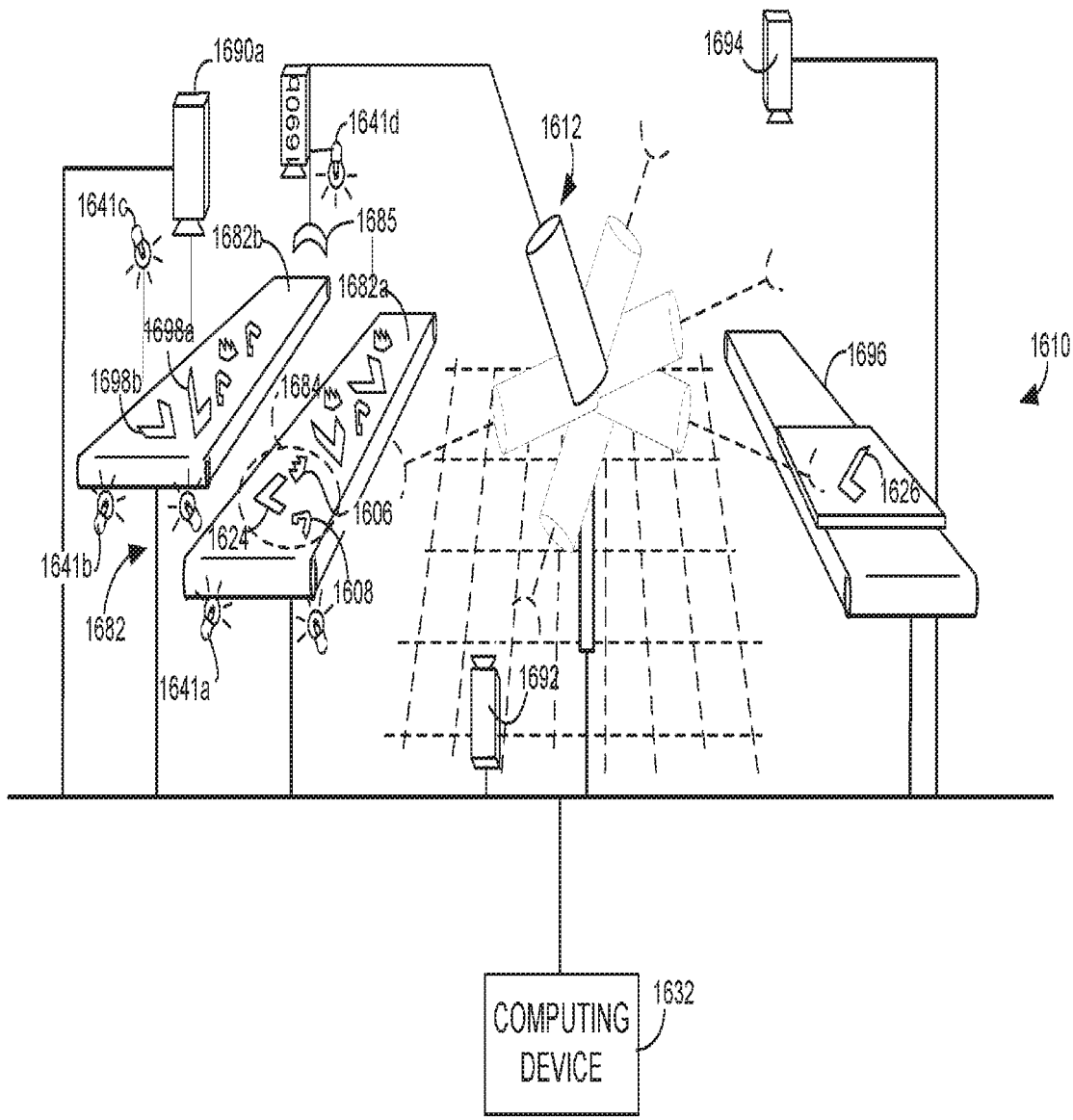

Referring to FIG. 15, a system 1610 is depicted in which a 2-D recognition system may be used to position an attachment part 1624, such as when the attachment shoe part 1624 is initially stored at a part-supply station 1682, which may be arranged into various configurations. As previously described, a part-supply station 1682 may comprise a set of stacked shoe parts from which part-transfer apparatus 1612 acquires a topmost attachment shoe part. Alternatively, the part-supply station 1682 may be comprised of a set of conveyors 1682*a* and 1682*b*, one of which transfers the attachment shoe part 1624 to a pickup location 1684 at which part-transfer apparatus 1612 may acquire the attachment shoe part 1624.

As previously described, part-transfer apparatus 1612 may have a part-pickup tool 685. Although part-transfer apparatus 1612 is illustrated to have a certain configuration depicted in FIG. 15, part-transfer apparatus may have a different configuration, such as the configuration depicted in FIG. 9, or a configuration comprising a plurality of articulating arms that enable movement of a camera (or an acquired shoe part) to a desired angle or position.

The attachment shoe part 1624 may be provided at the supply station 1682 among a plurality of different attachment shoe parts (e.g., 1606 and 1608), each of which may be attached to a respective portion of base shoe part 1626. As such, 2-D recognition system may execute a part-selection protocol, which allows the system to identify and select a desired attachment part.

In an exemplary part-selection protocol, the 2-D recognition system may be programmed to follow a predetermined order of attachment parts—i.e., attach first part 1624, followed by second part 1608, followed by third part 1606, etc. Accordingly, the 2-D recognition system may record images of all of the parts arranged among the plurality, identify each part (e.g., based on datastore 1220), and determine a geometric location of each part as it is positioned at supply station 1682. Once this position information has been determined by the 2-D recognition system, part-transfer apparatus 1612 may acquire and attach each part in the predetermined order.

In another part-selection protocol, the 2-D recognition system may be programmed to transfer and attach a set of parts, regardless of the order—i.e., attach first, second, and third parts in any order. Accordingly, once images of each part (e.g., 1606, 1608, and 1624) have been analyzed to determine a geometric position, part-transfer apparatus 1612 may acquire the parts in a variety of orders, as long as all of the parts are transferred to the base part 1626 at some point. Moreover, the 2-D recognition system may be programmed to retrieve the parts that are positioned in a manner that allows for the most efficient transfer from the supply station 1682 to base shoe part 1626. For example, if two first parts 1698*a* and 1698*b* are provided at the supply station and one of the first parts 1698*a* is closer than the other first part 1698*b* (based on respective geometric coordinates), the part-transfer apparatus 1612 may be instructed to pick up the closer first part 1698*a* instead of the other first part 1698*b*. Similarly, if a first part 1698*a* is rotated to a degree that may need less adjustment (relative to another first part 1698*b*) in order to be attached to base part 1626, the part-transfer apparatus 1612 may be instructed to pick up the first part 1698*a*. Computing device 1632 may help execute various operations, such as by executing certain steps in a part-selection protocol, analyzing images, and providing instructions to shoe-manufacturing equipment.

In another exemplary aspect, parts 1606, 1608, and 1624 may be arranged at part-pickup location 1684 in a pre-determined configuration, such that coordinates of the pre-determined configuration may be provided to apparatus 1612 to assist with part selection. That is, if a coordinate of each part 1606, 1608, and 1624 is pre-determined based on how the group of parts are to be arranged (prior to being picked up), then a coordinate may not have to be calculated based on images. Or, a pre-determined coordinate may be used as a check to confirm that a calculated coordinate is accurate (e.g., within a threshold amount away from the pre-determined coordinate).

In a further aspect, a pre-determined arrangement of parts 1606, 1608, and 1624 at part-pickup location 1684 may match an arrangement of the parts 1606, 1608, and 1624 when the parts are attached to base part 1626. That is, each of parts 1606, 1608, and 1624 may be spaced apart from one another and rotated in a manner that matches a spacing and rotation of each part when attached to base part 1626. As such, parts 1606, 1608, and 1624 may be picked up, placed, and/or attached as a collective group (i.e., more than one at a time) in a manner that maintains the pre-determined arrangement (i.e., maintains the spacing and rotation).

When an image is recorded of an attachment shoe part 1624 to determine an orientation of the attachment shoe part 1624, the camera may be positioned in various locations. As previously described, if the attachment shoe part 1624 is positioned at the supply station 1682 when the image is captured, the camera (e.g., 1690*b*) may be coupled directly to part-transfer apparatus 1612, or may be an above-mounted camera 1690*a*. Camera 1690*b* or 1690*a* may be perpendicularly oriented from shoe part 1624 when the image is recorded. For example, part-transfer apparatus 1612 may be comprised of one or more articulating arms that position camera 1690*b* above and perpendicular to shoe part 1624.

Moreover, light-emitting devices may be arranged throughout system 1610 to illuminate shoe part 1624 when positioned at part-supply station 1682. For example, a light-emitting device 1641*a* or 1641*b* may be positioned adjacent to, or integrated into, the supply station 1682 in order to backlight the attachment shoe parts positioned on conveyors 1682*a* and 1682*b*. Also, light-emitting devices 1641*c* may be positioned in a space surrounding part-supply station 1682 to illuminate a front side of shoe part 1624.

If the attachment shoe part 1624 is retained by part-transfer apparatus 1612 when the image is captured, the camera may be mounted remotely from the part-transfer apparatus 1612, such as camera 1690*a*, 1692, or 1694. In such an arrangement, shoe-transfer apparatus 1612 may position the attachment shoe part in front of (e.g., perpendicular to a field of view of) camera 1690*a*, 1692, or 1694. Moreover, a light-emitting device 1641*d* may be integrated into the part-transfer apparatus 1612, such as behind the part-pickup tool 1685, in order to illuminate the acquired shoe parts when the image is captured.

Although some of the above methods describe analyzing a single image to determine an orientation, multiple images of a single part, which are recorded by one or more cameras, may be analyzed to derive a set of geometric coordinates that are believed to accurately represent a position of a shoe part. In such a system, the set of geometric coordinates may be averaged or otherwise combined to arrive at a final geometric coordinate.

Referring now to FIG. 1016, a flow diagram is depicted of a method 1710 for positioning a shoe part in an automated manner during a shoe-manufacturing process. In describing FIG. 1016, reference is also be made to FIG. 11. In addition, method 1710, or at least a portion thereof, may be carried out when a computing device executes a set of computer-executable instructions stored on computer storage media.

At step 1712 an image (e.g., 1228) may be received depicting a two-dimensional representation (e.g., 232) of an attachment shoe part (e.g., 1224), which is to be attached to a base shoe part (e.g., 1226), wherein the two-dimensional representation of the attachment shoe part comprises a plurality of reference features 258. At step 1714, pixel coordinates of the image (e.g., coordinate of system 1256) are identified that correspond to the reference features. Step 1716 converts the pixel coordinates of the image to a geometric coordinate (e.g., 1205) of a geometric coordinate system (e.g., 2125), which maps a three-dimensional space within which the attachment shoe part (e.g., 1224) is positioned and a part-transfer apparatus (e.g., 1212) operates. Further, at step 1718, another geometric coordinate (e.g., 203) of the geometric coordinate system (e.g., 1225) is determined by analyzing a different image (e.g., 1230) depicting a two-dimensional representation (e.g., 1233) of the base shoe part (e.g., 1226) to which the attachment shoe part (e.g., 1224) will be attached. Step 1720 transfers, by the part-transfer apparatus (e.g., 1212), the attachment shoe part (e.g., 1224) to the other geometric coordinate (e.g., 1203), thereby moving the attachment shoe part to a location in the three-dimensional space at which the attachment shoe part is to be attached to the base shoe part.

Figure 17:
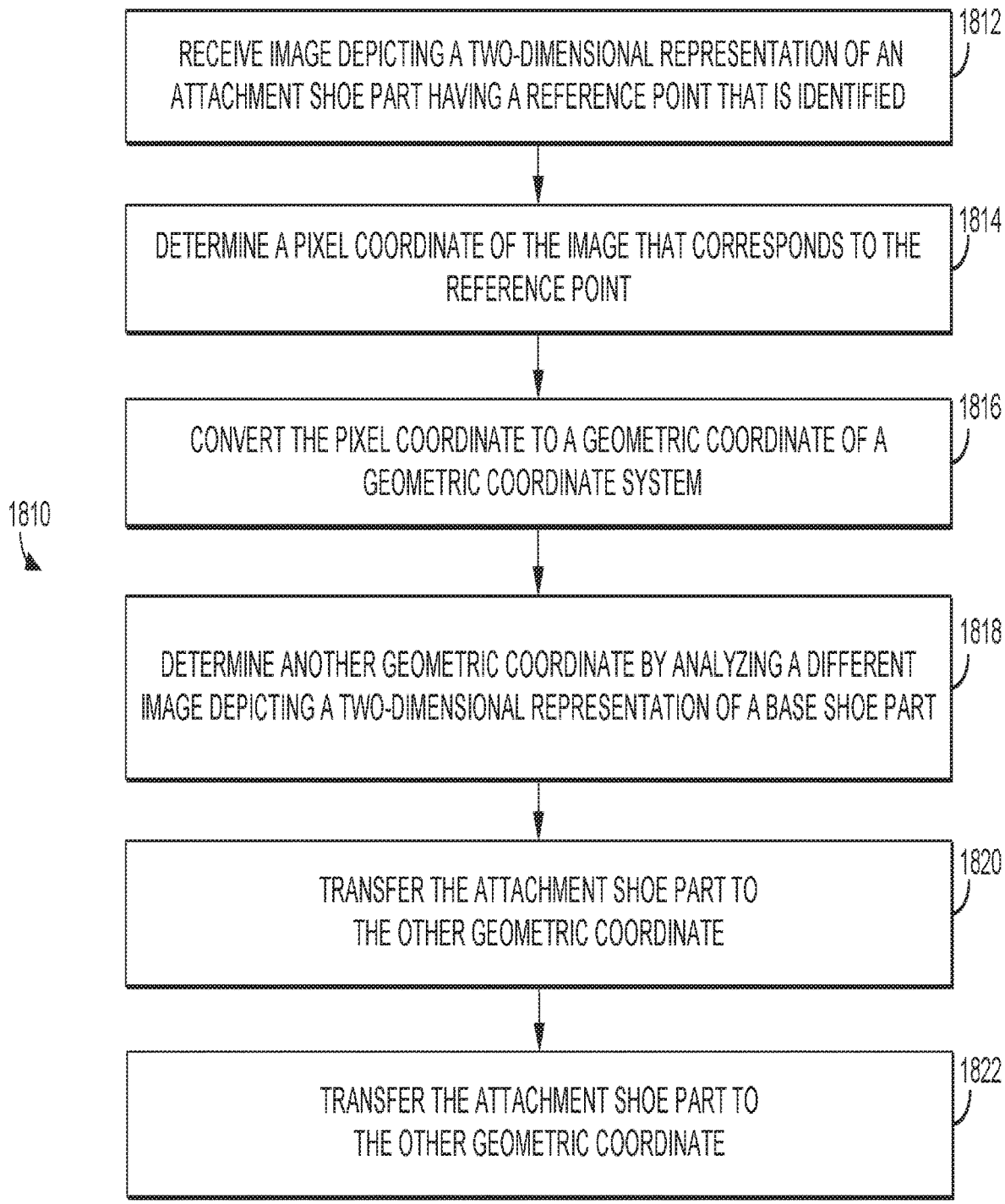

Referring now to FIG. 17, another flow diagram is depicted of a method 810 for positioning a shoe part in an automated manner during a shoe-manufacturing process. In describing FIG. 17, reference is also be made to FIG. 11. In addition, method 810, or at least a portion thereof, may be carried out when a computing device executes a set of computer-executable instructions stored on computer storage media.

At step 1812 an image (e.g., 1228) is received depicting a two-dimensional representation (e.g., 232) of an attachment shoe part (e.g., 1224), which is to be attached to a base shoe part (e.g., 1226), wherein the two-dimensional representation of the attachment shoe part comprises at least one reference feature 1258. At step 1814, pixel coordinates of the image (e.g., coordinate of system 1256) are identified that correspond to the at least one reference feature 1258. Step 1816 converts the pixel coordinates of the image to a geometric coordinate (e.g., 1205) of a geometric coordinate system (e.g., 1225), which maps a three-dimensional space within which the attachment shoe part (e.g., 1224) is positioned and a part-transfer apparatus (e.g., 1212) operates. Furthermore, step 1818 determines a plurality of other geometric coordinates (e.g., 1203 and 1202) in the geometric coordinate system by analyzing a different image (e.g., 1230) depicting a two-dimensional representation (e.g., 1233) of the base shoe part (e.g., 1226) to which the attachment shoe part (e.g., 1224) will be attached. The plurality of other geometric coordinates may comprise a part-position coordinate (e.g., 1203) and a part-attachment coordinate (e.g., 1201). Step 1820 transfers, by the part-transfer apparatus, the attachment shoe part (e.g., 1224) to the part-position coordinate (e.g., 1203), and step 1822 attaches the attachment shoe part to the base part at the part-attachment coordinate (e.g., 1201).

The 2-D recognition system described above may also be used for quality control purposes. For instance, the 2-D recognition system may allow for detection of a mismatched attachment part in a set of matching stacked attachment parts. Further, the 2-D recognition system may also enable quality control of shoe-part positioning to ensure position placement accuracy.

Figure 6:
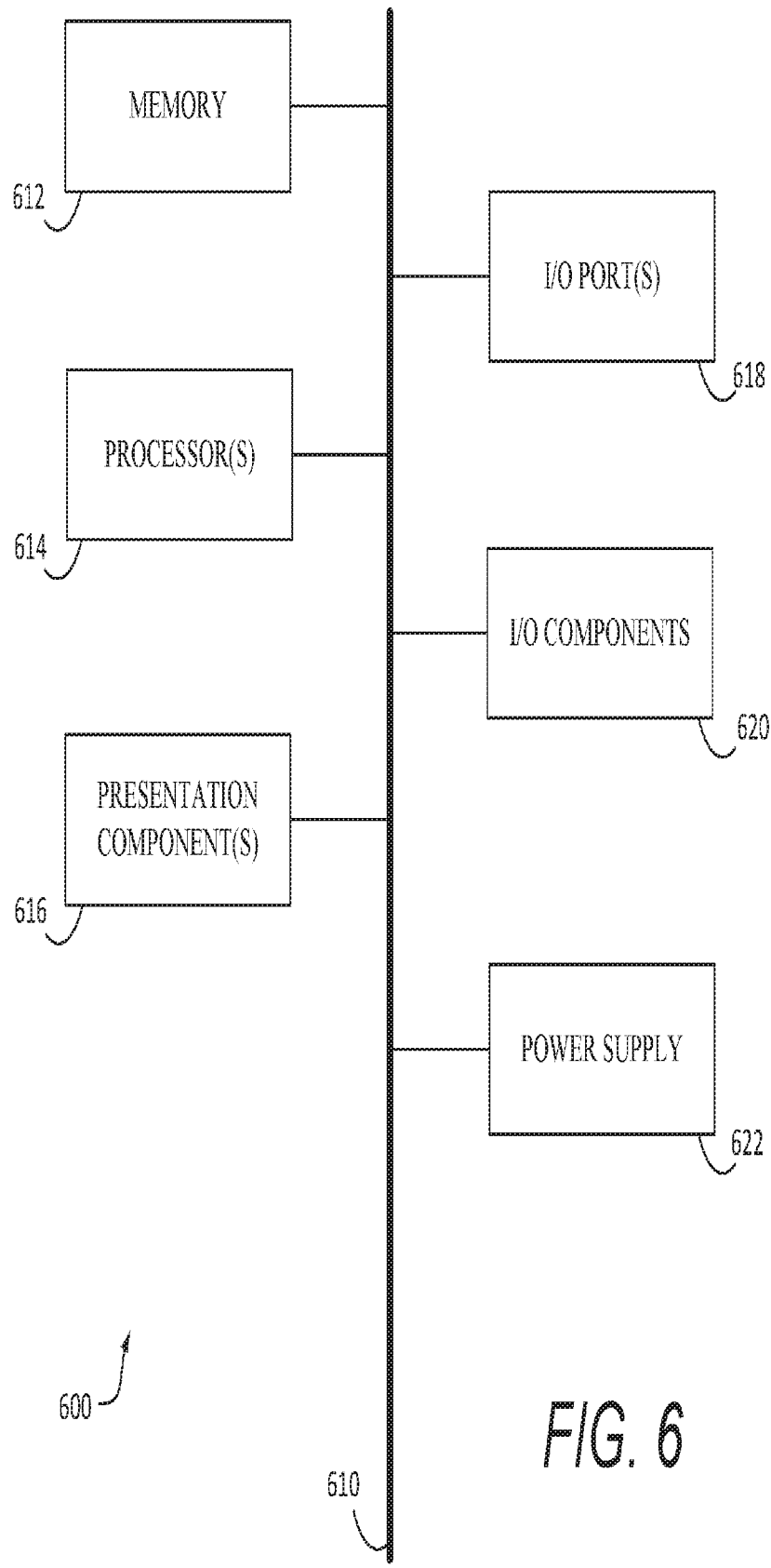
FIG. 6 depicts a block diagram of an exemplary computing device that may be used with systems and methods in accordance with the present invention.

As described above, our technology may comprise, among other things, a method, a system, or a set of instructions stored on one or more computer-readable media. Information stored on the computer-readable media may be used to direct operations of a computing device, and an exemplary computing device 600 is depicted in FIG. 6. Computing device 600 is but one example of a suitable computing system and is not intended to suggest any limitation as to the scope of use or functionality of invention aspects. Neither should the computing system 600 be interpreted as having any dependency or requirement relating to any one or combination of components illustrated. Moreover, aspects of the invention may also be practiced in distributed computing systems where tasks are performed by separate or remote-processing devices that are linked through a communications network.

Computing device 600 has a bus 610 that directly or indirectly couples the following components: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, processors may have memory.

Computing device 600 typically may have a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 600.

Memory 612 is comprised of tangible computer-storage media in the form of volatile and/or nonvolatile memory. Memory 612 may be removable, nonremovable, or a combination thereof. Exemplary hardware devices are solid-state memory, hard drives, optical-disc drives, etc.

Computing device 600 is depicted to have one or more processors 614 that read data from various entities such as memory 612 or I/O components 620. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

Presentation component(s) 616 present data indications to a user or other device. Exemplary presentation components are a display device, speaker, printing component, light-emitting component, etc. I/O ports 618 allow computing device 600 to be logically coupled to other devices including I/O components 620, some of which may be built in.

In the context of shoe manufacturing, a computing device 600 may be used to determine operations of various shoe-manufacturing tools. For example, a computing device may be used to control a part-pickup tool or a conveyor that transfers shoe parts from one location to another. In addition, a computing device may be used to control a part-attachment tool 130 that attaches (e.g., welds, adheres, stitches, etc.) one shoe part to another shoe part.

What is claimed is:

1. A system for picking up, transferring, and positioning a textile for manufacturing of an article, the system comprising:
    a pickup tool having a contact surface for capturing the textile with a first pickup force type and a second pickup force type, the contact surface comprising at least one vacuum port;
    a vacuum source coupled to the at least one vacuum port of the pickup tool, wherein the vacuum source provides the second pickup force type;
    a vision system capable of capturing an image of the textile, wherein the vision system comprises a first camera positioned at a first orientation relative to the textile and a second camera positioned at a second orientation relative to the textile, and wherein the first orientation is different than the second orientation, wherein the first orientation allows the vision system to capture a first image of a first surface of the textile and the second orientation allows the vision system to capture a second image of a second surface of the textile that is opposite to the first surface; and
    a computing device configured to activate or deactivate the first pickup force type and the at least one vacuum source to capture or release, respectively, the textile in response to, at least in part, the first image and the second image.

2. The system of claim 1, wherein the pickup tool has independently activated pickup zones.

3. The system of claim 1, further comprising a part-attachment tool coupled at a perimeter of the pickup tool.

4. The system of claim 1, wherein the first pickup force type and the second pickup force type are independently activated by the computing device.

5. The system of claim 1, wherein the pickup tool is coupled with a moving apparatus.

6. The system of claim 1, wherein the computing device, in connection with the vision system, is further configured to analyze the first image to determine at least one of:
    a size of the textile,
    a shape of the textile,
    a color of the textile,
    a thickness of the textile,
    an identity of the textile,
    compliance of the textile with quality-control measures, and
    a distance of the textile from other textiles.

7. The system of claim 1, wherein the pickup tool further comprises a release mechanism capable of actively releasing the textile from the contact surface.

8. The system of claim 7, wherein the release mechanism physically contacts the textile to cause the separation from the plate.

9. The system of claim 7, wherein the release mechanism is capable of blowing air against the textile.

10. A system for manufacturing an article, the system comprising:
    a first manufacturing station;
    a second manufacturing station having a first predetermined location for a first article component and a second predetermined location for a second article component;
    a pickup tool configured to initiate a first pickup force and a second pickup force that is different from the first pickup force, the pickup tool operable for capturing the first article component and the second article component;
    a robotic actuator coupled to the pickup tool and operable to move the pickup tool to reposition the captured first article component and the captured second article component over the first and second predetermined locations at the second manufacturing station, respectively, wherein the pickup tool is further operable to release the first article component and the second article component onto the first and second predetermined locations, respectively; and
    a vision system comprising a first camera coupled to a distal end of the pickup tool and a second camera coupled below the second manufacturing station, wherein the first camera and the second camera are operable to capture images of opposite surfaces of the first article component and/or the second article component where the images are relied on to activate the first pickup force.

11. The system of claim 10, wherein the vision system is operable for detecting manufacturing parts and performing at least one of: determining a part identity, determining a part orientation, and determining a part location.

* * * * *

UNITED STATES PATENT AND TRADEMARK OFFICE
CERTIFICATE OF CORRECTION

PATENT NO. : 11,953,877 B2
APPLICATION NO. : 17/969919
DATED : April 9, 2024
INVENTOR(S) : Dragan Jurkovic et al.

It is certified that error appears in the above-identified patent and that said Letters Patent is hereby corrected as shown below:

In the Specification

Column 32, Line 53:
The line reading "of rotation (i.e., 0) of the shoe-part representation (as" should read --of rotation (i.e., θ) of the shoe-part representation (as--

Column 36, Line 51:
The line reading "that is acquired by part-transfer apparatus 1512" should read --that is acquired by part-transfer apparatus 1512.--

Figure 16:
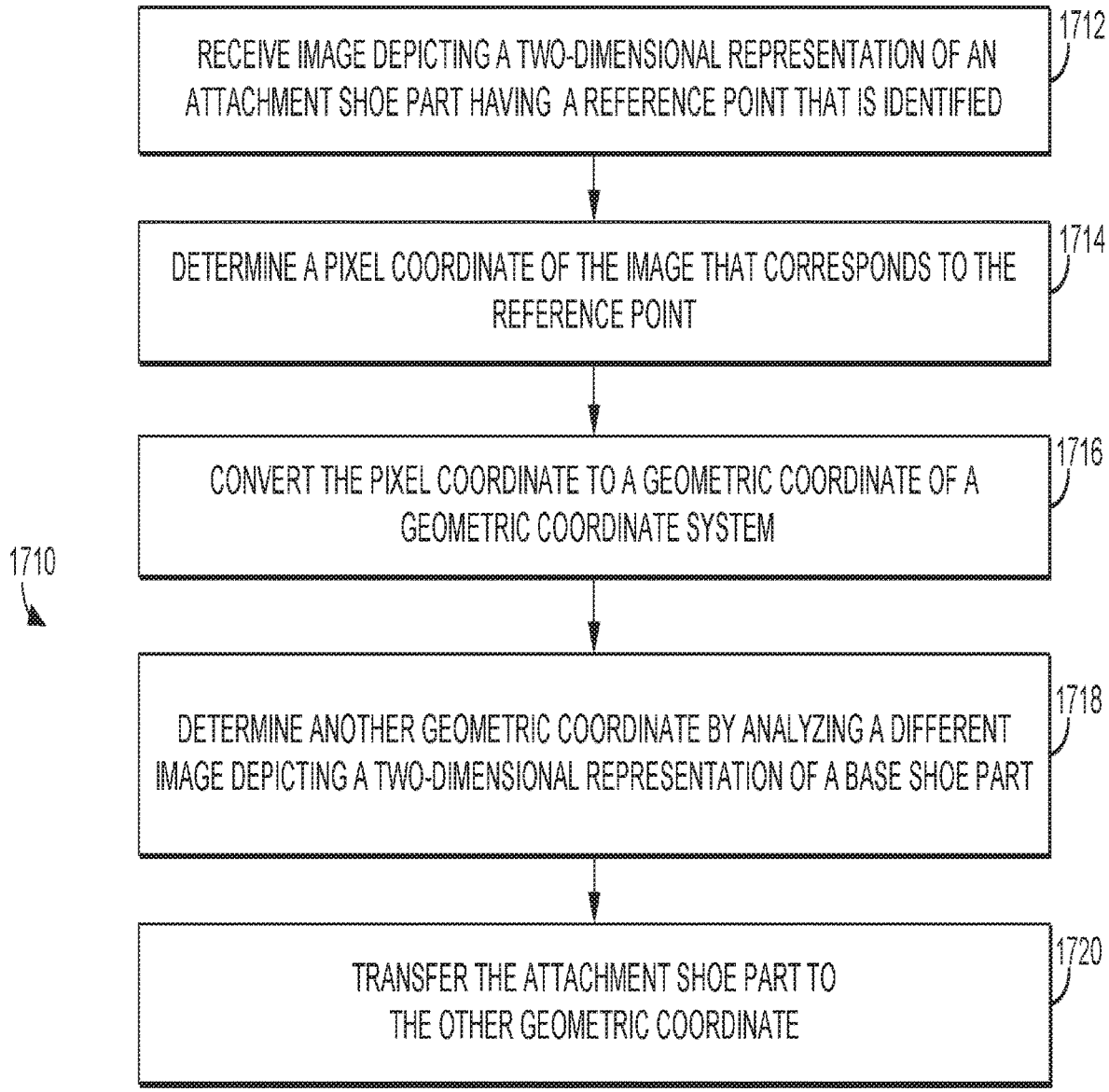
FIGS. 16 and 17 depict a respective flow diagram of a method for analyzing an image of a shoe part.

Column 39, Line 20:
The line reading "Referring now to FIG. 1016, a flow diagram is depicted of" should read --Referring now to FIG. 16, a flow diagram is depicted of--

Column 39, Line 23:
The line reading "FIG. 1016, reference is also be made to FIG. 11. In addition," should read --FIG. 16, reference is also be made to FIG. 11. In addition,--

Signed and Sealed this
Twenty-fifth Day of March, 2025

Coke Morgan Stewart
*Acting Director of the United States Patent and Trademark Office*